(12) United States Patent
Faust et al.

(10) Patent No.: US 11,968,927 B2
(45) Date of Patent: Apr. 30, 2024

(54) HARVESTER WITH FEED FORWARD CONTROL OF FILLING MECHANISMS

(71) Applicant: Deere & Company, Moline, IL (US)

(72) Inventors: Jeremy J. Faust, Grimes, IA (US); Kellen O'Connor, Grimes, IA (US)

(73) Assignee: DEERE & COMPANY, Moline, IL (US)

( * ) Notice: Subject to any disclaimer, the term of this patent is extended or adjusted under 35 U.S.C. 154(b) by 585 days.

(21) Appl. No.: 17/178,952

(22) Filed: Feb. 18, 2021

(65) Prior Publication Data

US 2022/0256770 A1  Aug. 18, 2022

(51) Int. Cl.
| A01D 43/073 | (2006.01) |
| A01D 41/127 | (2006.01) |
| A01D 43/08 | (2006.01) |
| G05D 1/00 | (2006.01) |

(52) U.S. Cl.
CPC ......... *A01D 43/073* (2013.01); *A01D 41/127* (2013.01); *A01D 43/087* (2013.01); *G05D 1/0293* (2013.01); *G05D 1/0027* (2013.01); *G05D 2201/0201* (2013.01)

(58) Field of Classification Search
CPC .. A01D 43/073; A01D 41/127; A01D 43/087; G05D 1/0293
See application file for complete search history.

(56) References Cited

U.S. PATENT DOCUMENTS

| 4,324,091 A | 4/1982 | Wistuba et al. |
| 4,441,846 A | 4/1984 | Johnson |
| 5,575,316 A * | 11/1996 | Pollklas ............... A01D 43/087 141/96 |
| 5,749,783 A * | 5/1998 | Pollklas .................... G05D 3/12 56/10.2 D |
| 6,943,824 B2 * | 9/2005 | Alexia ................. A01D 43/073 348/148 |
| 7,537,519 B2 * | 5/2009 | Huster ................. A01D 43/087 414/397 |

(Continued)

OTHER PUBLICATIONS

Extended European Search Report and Written Opinion issued in European Patent Application No. 22154037.0, dated Jul. 7, 2022, in 06 pages.

*Primary Examiner* — Ramsey Refai
(74) *Attorney, Agent, or Firm* — Joseph R. Kelly; Kelly, Holt & Christenson, PLLC

(57) ABSTRACT

An agricultural harvester has a frame and a spout that is movably mounted relative to the frame. A spout actuator drives movement of the spout relative to the frame. Harvesting functionality engages material from a field and delivers the material through an outlet end of the spout as the agricultural harvester moves through the field in a direction of travel. A turn identifier identifies a location of a turn forward of the agricultural harvester and generates a turn location indicator indicative of the location of the turn. A speed detector detects a speed of the agricultural harvester and generates a speed indicator indicative of the detected speed. A position compensation control system generates spout position compensation information based on the turn location indicator and the speed indicator, and a spout position controller controls the spout actuator based on the spout position compensation information.

14 Claims, 12 Drawing Sheets

(56) References Cited

U.S. PATENT DOCUMENTS

| | | | | |
|---|---|---|---|---|
| 8,428,829 B2* | 4/2013 | Brunnert | .............. | A01D 43/087 |
| | | | | 701/50 |
| 9,924,636 B2 | 3/2018 | Lisouski et al. | | |
| 10,194,587 B2* | 2/2019 | Hien | .................... | A01D 43/087 |
| 2005/0197175 A1* | 9/2005 | Anderson | .............. | A01G 23/00 |
| | | | | 460/1 |
| 2010/0110185 A1* | 5/2010 | Tafazoli Bilandi | .... | H04N 7/183 |
| | | | | 455/39 |
| 2012/0263560 A1* | 10/2012 | Diekhans | .............. | A01D 43/087 |
| | | | | 414/294 |
| 2016/0249533 A1* | 9/2016 | Byttebier | ............... | A01D 90/10 |
| | | | | 701/50 |

* cited by examiner

US 11,968,927 B2

HARVESTER WITH FEED FORWARD CONTROL OF FILLING MECHANISMS

FIELD OF THE DESCRIPTION

The present description relates to harvesting machines. More specifically, the present description relates to automatically performing feed forward control when filling a receiving vehicle.

BACKGROUND

There are a wide variety of different types of agricultural vehicles. Some vehicles include harvesters, such as forage harvesters, sugar cane harvesters, combine harvesters, and other harvesters, that harvest grain or other crop. Such harvesters often unload into carts which may be pulled by tractors or semi-trailers as the harvesters are moving.

By way of example, while harvesting in a field using a forage harvester, an operator attempts to control the forage harvester to maintain harvesting efficiency, during many different types of conditions. The soil conditions, crop conditions, and other things can all change. This may result in the operator changing control settings. This means that the operator needs to devote a relatively large amount of attention to controlling the forage harvester.

At the same time, a semi-truck or tractor-pulled cart is often in position relative to the forage harvester (e.g., behind the forage harvester or alongside the forage harvester) so that the forage harvester can fill the truck or cart while moving through the field. In some current systems, this requires the operator of the forage harvester to control the position of the unloading spout and flap so that the truck or cart is filled evenly, but not overfilled. Even a momentary misalignment between the spout and the truck or cart may result in hundreds of pounds of harvested material being dumped on the ground, or elsewhere, rather than in the truck or cart.

The discussion above is merely provided for general background information and is not intended to be used as an aid in determining the scope of the claimed subject matter.

SUMMARY

An agricultural harvester has a frame and a spout that is movably mounted relative to the frame. A spout actuator drives movement of the spout relative to the frame based on a spout actuator control signal. Harvesting functionality engages material from a field and delivers the material through an outlet end of the spout as the agricultural harvester moves through the field in a direction of travel. A turn identifier identifies a location of a turn forward of the agricultural harvester in the direction of travel and generates a turn location indicator indicative of the location of the turn. A speed detector detects a speed of the agricultural harvester and generates a speed indicator indicative of the detected speed. A position compensation control system generates spout position compensation information for controlling the spout actuator based on the turn location indicator and the speed indicator, and a spout position controller generates the spout actuator control signal to control the spout actuator based on the spout position compensation information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
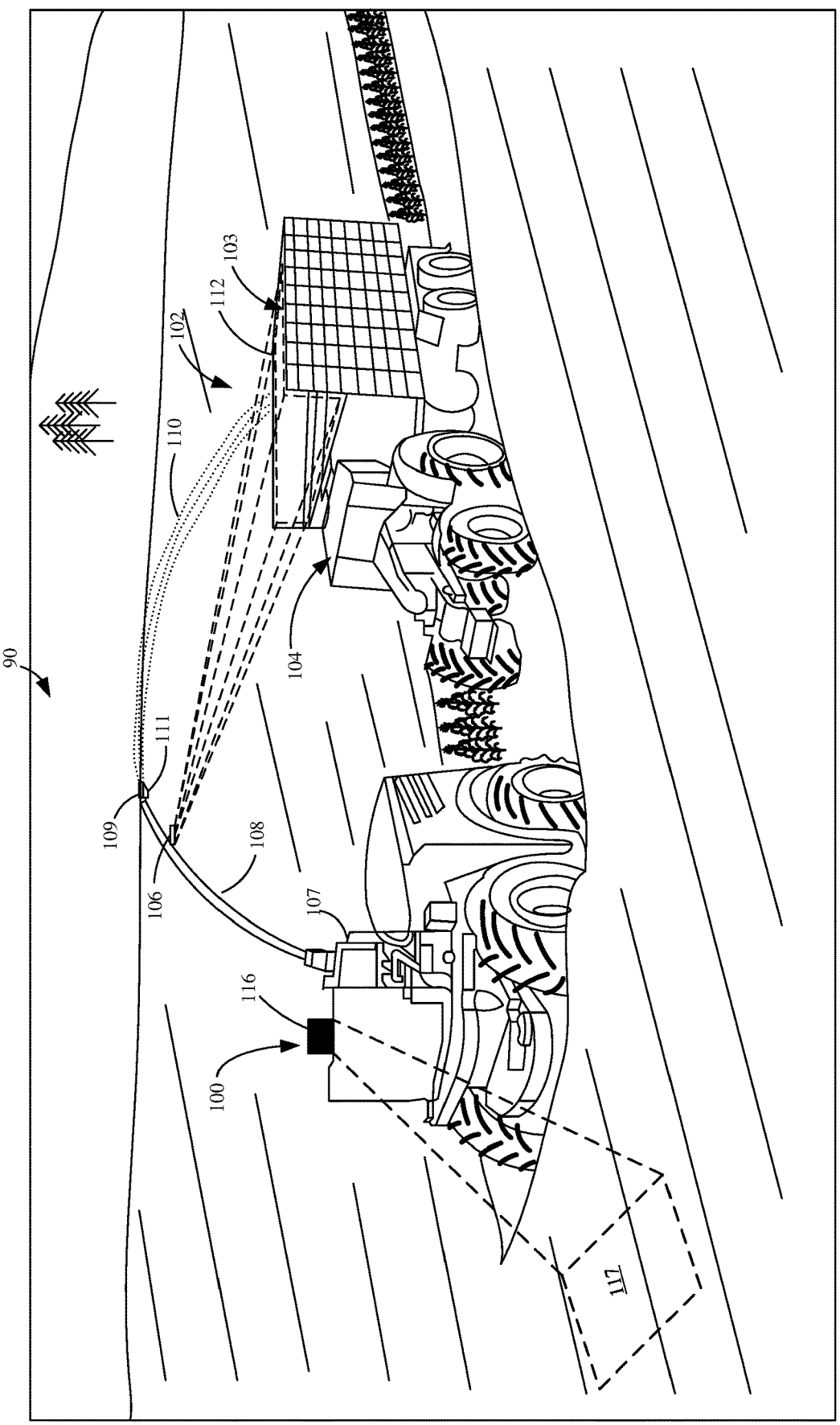
FIG. 1 is a pictorial illustration of one example of a forage harvester filling a receiving vehicle, with the receiving vehicle in a position behind the forage harvester.

As discussed above, it can be very difficult for an operator to maintain high efficiency in controlling a forage harvester, and also to optimally monitor the position of the receiving vehicle. This difficulty can even be exacerbated when the receiving vehicle is located behind the forage harvester, so that the forage harvester is executing a rear unloading operation, but the difficulty also exists in side-by-side unloading scenarios.

In order to address these issues, some automatic cart filling control systems have been developed to automate portions of the filling process. One such automatic fill control system uses a stereo camera on the spout of the harvester to capture an image of the receiving vehicle. An image processing system determines dimensions of the receiving vehicle and the distribution of the crop deposited inside the receiving vehicle. The system also detects crop height within the receiving vehicle, in order to automatically aim the spout toward empty spots and control the flap position to achieve a more even fill, while reducing spillage. Such systems can fill the receiving vehicle according to a fill strategy (such as front-to-back, back-to-front, etc.) that is set by the operator or that is set in other ways.

However, such systems are reactive in that the systems detect the current landing point of crop in the receiving vehicle and compare the detected landing point to a desired landing point and controls the spout and flap so the crop being loaded into the receiving vehicle lands at the desired landing point. This can be problematic in some scenarios, such as when the harvester makes a turn (e.g., a headland turn or a turn to follow a curved windrow or curved crop rows).

When the harvester makes a turn, the position of the spout relative to the receiving vehicle changes rapidly. Because current fill systems are reactive, they often cannot react quickly enough to keep the position of the spout relative to the receiving vehicle at a desired spot to keep filing the receiving vehicle at the desired landing point.

Some current automatic fill systems have attempted to address this by sensing the angular velocity of the harvester (e.g., the rate at which the harvester is turning). When the angular velocity of the harvester exceeds a threshold value, then the spout is commanded to one extreme end of travel (e.g., to aim at the extreme front end of the receiving vehicle or the extreme back end of the receiving vehicle). However, this is still reactive control in that the spout is not positioned in this way until the harvester is actually turning and the turn is detected. Thus, this type of reactive system is often still not fast enough to avoid spillage. Similarly, even if spillage is avoided, the crop is often not placed at the desired landing point in the receiving vehicle according to the desired fill strategy.

Also, some forage harvesters do not have such an automatic cart filling control system. Therefore, during turns, the burden on the operator to maintain the position of the spout relative to the receiving vehicle, is increased. This can result in the receiving vehicle being out of position to receive the harvested material, or so that the harvested material lands at a landing point that is different from the desired landing point.

If this happens, it is difficult for the operator of the forage harvester to react quickly enough to take corrective action, which can result in hundreds of pounds of harvested material being dumped onto the ground, rather than into the receiving vessel on the receiving vehicle, or the harvested material can sometimes impact and damage the towing vehicle.

The present description thus proceeds with respect to a harvester that automatically detects when a turn is approaching and begins commanding the spout and flap actuators to position the spout and flap to compensate for the turn so the harvested material lands at the desired landing point, even during the turn.

FIG. 1 is a pictorial illustration showing one example of a self-propelled forage harvester 100 filling a tractor-pulled grain cart (or receiving vehicle) 102. Cart 102 thus defines an interior that forms a receiving vessel 103 for receiving harvested material through a receiving area 112. In the example shown in FIG. 1, a tractor 104, that is pulling grain cart 102, is positioned directly behind forage harvester 100. Also, in the example illustrated in FIG. 1, forage harvester 100 has a camera 106 mounted on the spout 108 through which the harvested material 110 is traveling. The spout 108 can be pivotally or rotationally mounted to a frame 107 of harvester 100. Camera 106 captures an image of the receiving area 112 of cart 102. In the example shown in FIG. 1, the receiving area 112 is defined by an upper edge of the walls of cart 102.

When harvester 100 has an automatic cart fill control system that includes image processing, as discussed above, that system can gauge the height of harvested material in cart 102, and the location of that material. The system thus automatically controls the position of spout 108 and flap 109 to direct the trajectory of material 110 into the receiving area 112 of cart 102 to obtain an even fill throughout the entire length and width of cart 102, while not overfilling cart 102. By automatically, it is meant, for example, that the operation is performed without further human involvement except, perhaps, to initiate or authorize the operation.

If harvester 100 turns (such as to follow a curved windrow or curved crop rows or to make a headland turn), this can drastically and quickly change the position of the outlet end 111 of spout 108 relative to the receiving vessel 103, in cart 102. The relative change in position can often happen so fast that an automatic fill control system that automatically positions spout 108 and flap 109 cannot react quickly enough to compensate for the change in position, resulting in harvested material 110 being dumped on the ground, or being directed at tractor 104, or entering cart 102 at an undesired position.

Therefore, in one example, a forward looking device 116 is mounted to detect an image of an area 117 of the crop or windrow ahead of harvester 100 in the direction of travel. By analyzing the image, upcoming turns can be identified before harvester 100 even begins the turns. Thus, feed forward control signals can be generated to control the position of spout 108 and flap 109 to compensate for the turn. In this way, less crop is lost and a more accurate fill operation can be performed.

In one example, regardless of whether harvester 100 has an automatic fill control system, forward looking device 116 can be used with a control system to control the position of spout 108 and flap 109 based on upcoming turns. For instance, the spout 108 and flap 109 can be controlled to continue filling at the current landing point during the turn. This can greatly relieve the operator of the burden of trying to control spout 108 and flap 109 while also trying to control harvester 100 to navigate a turn.

Figure 2:
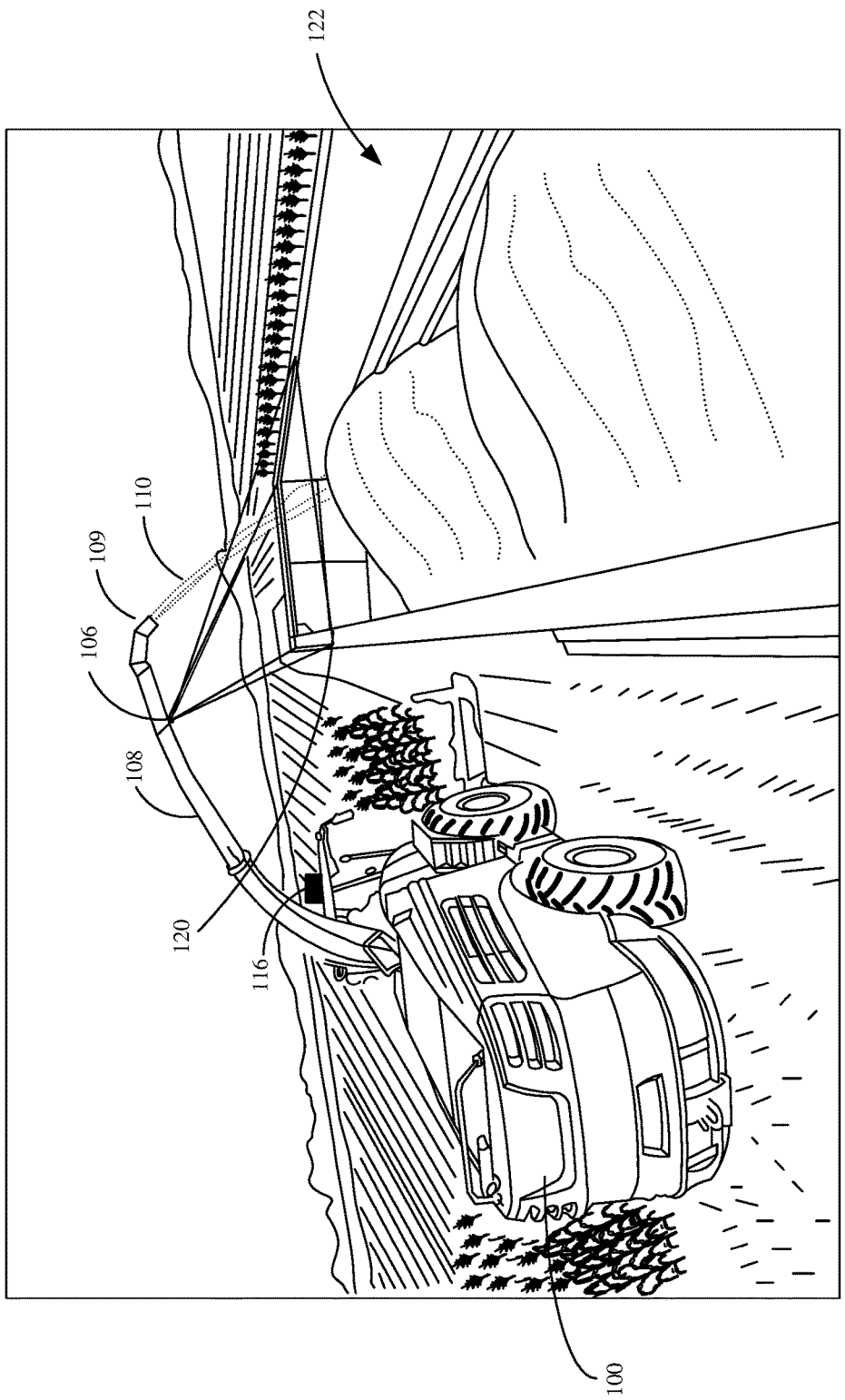
FIG. 2 is a pictorial illustration of one example of a forage harvester filling a receiving vehicle that is alongside the forage harvester.

FIG. 2 is a pictorial illustration showing another example of a self-propelled forage harvester 100, this time loading a semi-trailer (or receiving vessel on a receiving vehicle) 122 in a configuration in which a semi-tractor is pulling semi-trailer 122 alongside forage harvester 100. Therefore, the spout 108 and flap 109 are positioned to unload the harvested material 110 to fill trailer 122 according to a pre-defined side-by-side fill strategy. Again, FIG. 2 shows that camera 106 can capture an image of semi-trailer 122. In the example illustrated in FIG. 2, the field of view of camera 106 is directed toward the receiving area 120 of trailer 122 so that image processing can be performed to identify a landing point for the harvested material in trailer 122. As with the example shown in FIG. 1, if the crop rows (or a windrow) in front of harvester 100 turn, this can quickly change the position of spout 108 relative to semi-trailer 122, resulting in harvested material 110 being placed where it is not desired. Therefore, forward looking device 116 can be used on harvester 100 to identify upcoming turns so that spout 108 and flap 109 can be controlled in a feed forward way (before harvester 100 actually begins to execute a turn) to compensate for turns.

Figure 3:
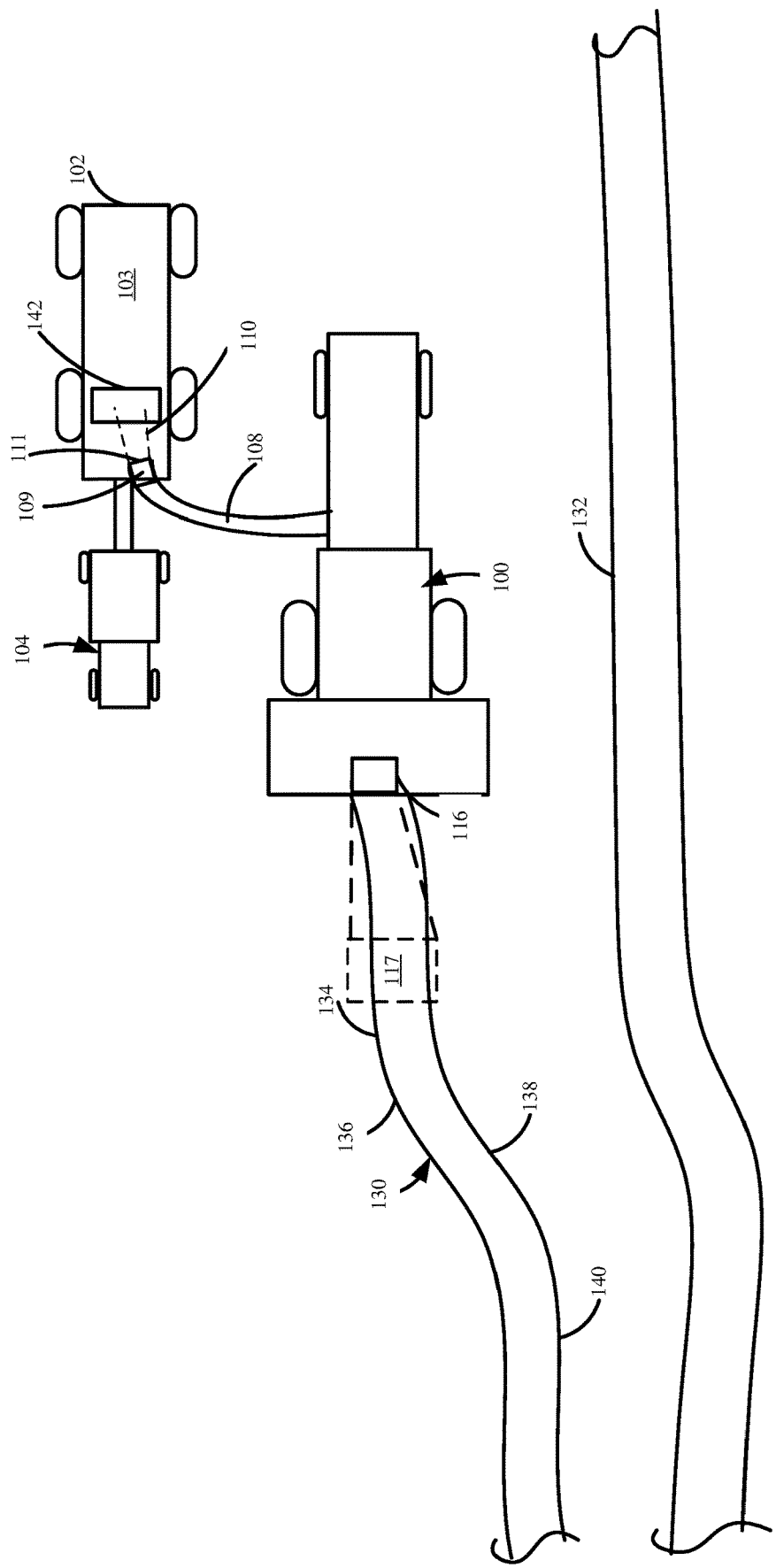
FIG. 3 is a pictorial illustration of a harvester and receiving vehicle harvesting a curved windrow.

FIG. 3 is a pictorial illustration of a top view of one example of harvester 100, towing vehicle 104 and cart 102. In the example shown in FIG. 3, towing vehicle 104 is towing cart 102 alongside harvester 100, and harvester 100 is following a windrow 130. FIG. 3 also shows another, unharvested, windrow 132 in the field. It can be seen that windrow 130 begins a turn at a location 134 and ends the turn at a location 136. Windrow 130 again turns beginning at a location 138 and ending at a location 140. FIG. 3 also shows forward-looking device 116 that is capturing an image of an area 117 in front of harvester 100 in the direction of travel. As harvester 100 travels along windrow 130, it reaches the beginning of the first turn at 134 and begins to turn to the left. This causes spout 108 to swing to the left relatively quickly, because the turn beginning at location 137 is at an angle and the angular movement of the end 110 of the spout 108 is amplified by the length of spout 108. Thus, when the harvester 100 executes the turn, this quickly changes the position of the outlet end 111 of spout 108 relative to the receiving vessel 103 defined by cart 102. If harvester 100 is not equipped with an automatic fill control system, then this means that the operator of harvester 100 and the operator of tractor 104 must coordinate to ensure that the harvested material continues to go into vessel 103, and is not dumped on the ground. This can be very difficult, and the problem is exacerbated by the fact that both operators are attempting to navigate a turn, at roughly the same time.

Even if harvester 100 has an active fill control system, the turn can present problems. As discussed above, current active fill control systems are reactive in that they sense the actual landing point (e.g., landing point 142) of harvested material 110 in receiving vessel 103. If the position of spout 108 moves relative to receiving vessel 103, and the harvested material 110 is landing outside of the desired landing point 142, then the automatic fill control system automatically reacts to that change in position, and actuates actuators that change the position of spout 108 and/or flap 109 in an attempt to have the harvested material again deposited at the desired landing position 142. However, because such systems are reactive, when the position of spout 108 changes quickly and significantly relative to the position of receiving vessel 103, then the automatic fill control system often cannot react quickly enough to compensate for that change in relative position in order to keep the harvested material landing in the desired landing point 142. This may result in harvester 100 over filling certain portions of receiving vessel 103, and under filling other portions of receiving vessel 103. Similarly, the inability to compensate for changes in relative position between spout 108 and receiving vessel 103 can also result in the harvested material being dumped on the ground or even contacting towing vehicle 104.

Also, as mentioned above, some active fill control systems allow the filling operation to be performed according to a pre-defined or selected fill strategy. Some such fill strategies include a front-to-back strategy, where the front of receiving vessel 103 is filled first and then the desired landing point 142 is moved rearwardly in receiving vessel 103, where filling continues. This filling operation continues, using the front-to-back strategy, until the entire receiving vessel 103 is evenly filled. Another strategy, similar to the front-to-back fill strategy is the back-to-front fill strategy. According to the back-to-front fill strategy, filling begins in the rear of receiving vessel 103 and proceeds to the front of receiving vessel 103. Again, because this type of active fill control system is reactive, it may not be able to compensate for a quick and significant change in the position of spout 108 relative to the position of receiving vessel 103, which can happen during turns. Thus, even if material is not dumped on the ground during a turn, the system still may be unable to perform the fill operation according to the selected fill strategy.

Harvester 100 thus includes forward-looking device 116 which senses an area (e.g., captures an image of an area) 117 in front of harvester 100, in the direction of travel. Device 116 can be a camera, a stereo camera, a LIDAR sensor, a RADAR sensor, or another type of sensor which can generate information indicative of the location of windrow 130. A control system on harvester 100 processes the image or sensor data generated from area 117 to identify the location 134 where the turn begins, the angle of the turn, and the speed of harvester 100. As harvester 100 continues along windrow 130, the control system can also identify the location 136 where the turn ends. Based on the location 134 where the turn begins, the angle of the turn, and the speed of harvester 100, the control system can determine what control signals it needs to generate, and when it needs to generate them, in order to control the position of spout 108 and flap 111, as harvester 100 makes the turn, so that the harvested material continues to be deposited in receiving vessel 103 at the desired landing point 142. In systems that do not have an active fill control system, the desired landing point 142 may be the point where the harvested material is landing based on an operator or other input that positions spout 108 and flap 109. When the harvester 100 does include an active fill control system, then, even as the desired landing point 142 changes within receiving vessel 103 according to the selected fill strategy, the control system continues to generate control signals so that the harvested material is deposited in the desired landing position, while harvester 100 makes the turn beginning at location 134 and ending at location 136. Because the control system in harvester 100 identifies, ahead of time, where the turn begins, the angle of the turn, and the speed of harvester 100, the control system can begin controlling the actuators that drive the position of spout 108 and flap 109 a sufficient amount of time prior to harvester 100 beginning the turn so that the harvested material is continuously deposited in receiving vessel 103, and at the desired landing point 142.

It will be noted that other examples are contemplated herein as well. For instance, in the example shown in FIG. 3, the windrows 130 and 132 are generated by a prior pass of a windrower machine. The windrower machine can use a geographic position sensor (such as a Global Navigation Satellite System—GNSS—receiver, or another positioning system) to generate a map indicating the location of the windrows 130 and 132. Then, the control system of harvester 100 can obtain the map and identify where turns are about to occur in the windrow based on the map and the current position of harvester 100 and use that information to generate feed forward control signals to control the actuators that drive positioning of spout 108 and flap 109. Other ways of identifying the location of the turn, and the angle of the turn, can be used as well.

Similarly, the control system can be used where harvester 100 is harvesting a crop (such as corn or beans), instead of following a windrow. The area 117 that is sensed by forward-looking device 116 can be used to detect the location and orientation of the crop rows, or the edge of the unharvested crop (such as in the case of a sugarcane harvester) and the direction and orientation of the crop rows or the edge of the harvested crop ahead of harvester 100 can be used to determine when harvester 100 is about to turn. Again, the location and angle of the turn can be used to generate feed forward control signals to control the actuators that drive positioning of spout 108 and flap 109.

Figure 4:
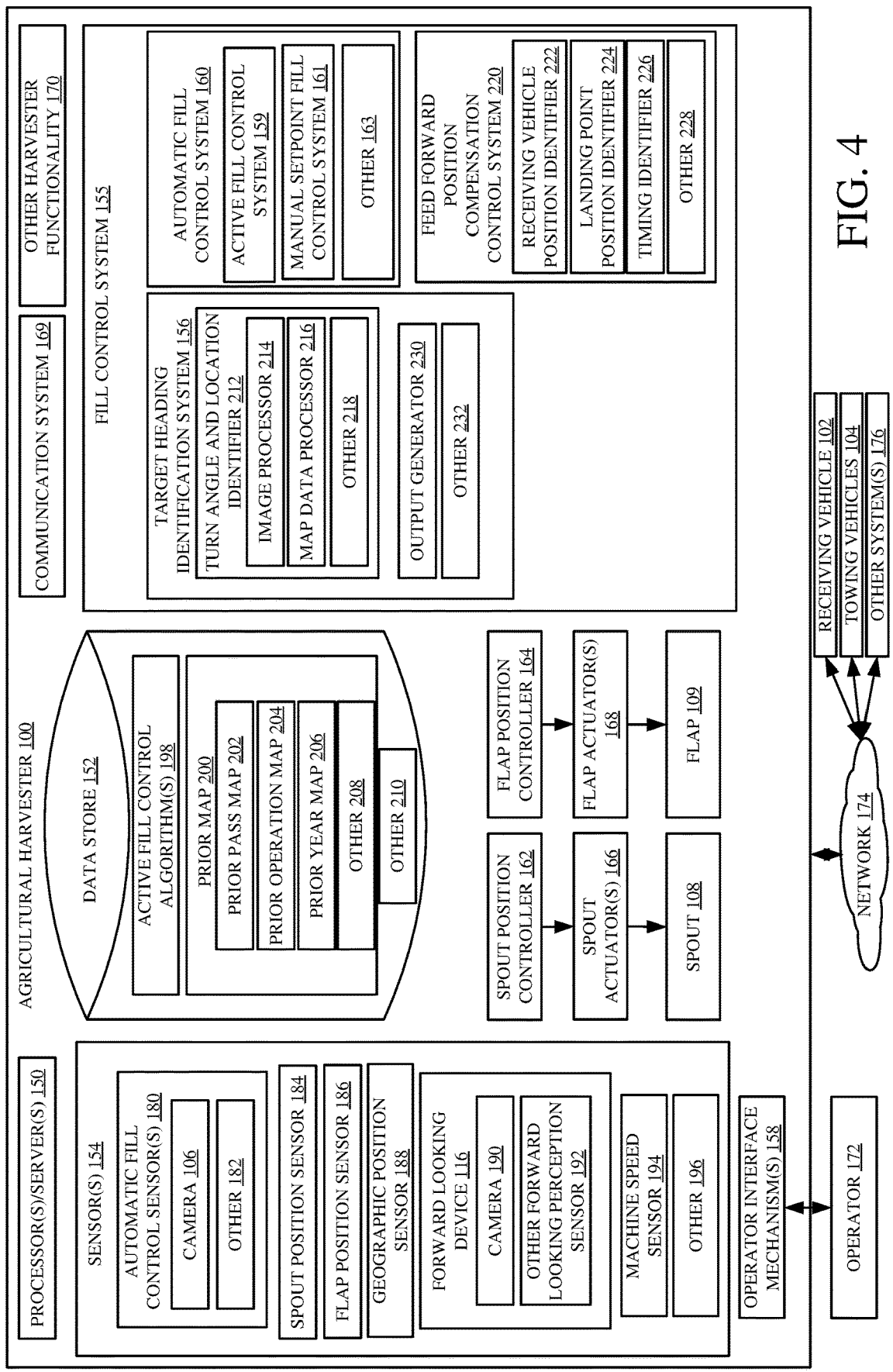
FIG. 4 is a block diagram of one example of a harvester.

FIG. 4 is a block diagram showing one example of agricultural harvester 100. Some of the items are similar to those shown in FIGS. 1-3, and they are similarly numbered. In the example of agricultural harvester 100 shown in FIG. 4, harvester 100 can include one or more processors or servers 150, data store 152, sensors 154, fill control system 155 (which can include feed forward position compensation control system 220, target heading identification system 156, output generator 230, automatic fill control system 160, and other items 232), operator interface mechanisms 158, spout position controller 162, flap position controller 164, one or more spout actuators 166 and flap actuators 168, communication system 169, and other harvester functionality 170. FIG. 4 also shows that operator 172 can interact with one or more operator interface mechanisms 158 in order to control and manipulate agricultural harvester 100. FIG. 4 also shows that harvester 100 can communicate over network 174 with receiving vehicle 102, towing vehicle 104, and other systems 176.

Sensors 154 can include automatic fill control sensors 180 (which themselves can include camera 106 and other automatic fill control sensors 182), spout position sensor 184, flap position sensor 186, geographic position sensor 188, forward-looking device 116, (which can include camera 190 or other forward-looking perception sensors 192), machine speed sensor 194, and other items 196. Data store 152 can include active fill control algorithms 198, and one or more prior maps 200. Prior maps 200 can include a prior pass map 202 that maps prior passes through the field by harvester 100, prior operation map 204 that has a map generated during a prior operation in the field other than the harvesting operation being performed by harvester 100, and prior year map 206 that includes a map generated during an operation performed during a prior growing year. Prior map 200 can also include other prior maps 208, which may include satellite maps or other aerial image maps (such as maps generated from images taken by an unmanned or manned aerial vehicle), or other maps that show the field being harvested by harvester 100, prior to harvester 100 performing the harvesting operation. Data store 152 can include other items 210 as well.

Fill control system 155 generates signals that are used by spout position controller 162 and flap position controller 164 to automatically direct the harvested material to fill the receiving vessel 103, as desired. Automatic fill control system 160 can include active fill control system 159, manual set-point fill control system 161, and other items 163. Active fill control system 159 executes an active fill control algorithm 198 to fill receiving vessel 103 according to a selected active fill strategy. Manual set point fill control system 161 generates outputs to automatically maintain filling of vessel 103 at an operator input landing point.

Target heading identification system 156 includes turn angle and location identifier 212, which, itself, can include image processor 214, map data processor 216, and other items 218. Target heading identification system 156 can also include output generator 230 and other items 232. Feed forward position compensation control system 220 can include receiving vehicle position identifier 222, landing point position identifier 224, timing identifier 226, and other items 228.

Before describing the overall operation of agricultural harvester 100 in identifying the location and angle of upcoming turns and controlling spout actuators 166 and flap actuator 168 in a feed forward manner, a brief description of some of the items in agricultural harvester 100, and their operation, will first be provided.

Operator interface mechanisms 158 can be any of a wide variety of different mechanisms that operator 172 can interact with in order to control and manipulate agricultural harvester 100. For example, mechanisms 158 can include a steering wheel, joysticks, levers, pedals, dials, buttons, linkages, etc. In addition, mechanisms 158 can be display devices, such as a display screen, a touch sensitive display screen, lights, or other visual mechanisms. Operator interface mechanisms 158 can include input mechanisms, such as a point and click device, icons, links, or buttons that can be actuated using a touch gesture, or other mechanisms. Operator interface mechanisms 158 can also include a speaker and a microphone (such as where speech recognition and speech synthesis functionality is provided), other audio mechanisms, or a variety of different haptic mechanisms.

Automatic fill control sensors 180 are illustratively sensors that are used to generate sensor signals for fill control system 155. Therefore, in one example, sensors 180 can include camera 106 that is used to identify the opening in receiving vessel 103, so that a landing position, where harvested material will land in vessel 103, can be determined. Similarly, sensors 180 can include a stereo camera or other cameras that can be used to identify the fill level of harvested material 110 in the receiving vessel 103.

Spout actuators 166 can include a wide variety of different types of actuators that can be used to drive movement of spout 108. For instance, spout 108 may be rotationally or pivotally mounted on harvester 100, and spout actuator 166 can be one or more hydraulic actuators, electric actuators, other linear or rotary actuators, or other actuators that can be used to drive rotation or pivotal movement of spout 108 relative to the frame or body of harvester 100. Therefore, spout position controller 162 illustratively generates signals to control spout actuators 166 to move spout 108 to a desired position.

Flap 109 is illustratively moveably (e.g., hingedly or otherwise moveably) mounted to the output end 111 of spout 108 to direct the trajectory of harvested material 110 as it exits the outlet end 111 of spout 108. Flap actuators 168 can also include one or more linear or rotary actuators, hydraulic or electric actuators, or any of a wide variety of other actuators that can be used to drive movement of flap 109. Therefore, flap position controller 164 generates control signals to control flap actuators 168 so that flap 109 is moved to a desired position. The desired positions for spout 108 and flap 109 may be determined by automatic fill control system 160, such as by active fill control system 159 or by the operator through manual set point fill control system 161, or in other ways.

Spout position sensor 184 illustratively senses the position of spout 108. For instance, spout position sensor 184 may be a potentiometer or other rotary position sensor, a Hall Effect sensor, a linear position sensor, a capacitance sensor, or another type of sensor. Spout position sensor 184 can be configured to either sense the position of spout actuators 166 (so that the position of spout 108 can be derived) or to directly sense the position of spout 108 relative to the body or frame of harvester 100. Flap position sensor 186 can be a linear position sensor, a rotary position sensor, a potentiometer, a Hall Effect sensor, a capacitance sensor, or any of a wide variety of other sensors that can be used to sense the position of flap actuators 168 or flap 109. Spout position sensor 184 and flap position sensor 186 illustratively generate sensor signals indicative of the sensed spout position and flap position, respectively.

Geographic position sensor 188 can be any of a variety of different types of sensors that sense the geographic position of harvester 100. For instance, sensor 188 can be a GNSS receiver, a cellular triangulation sensor, a dead reckoning sensor, or any of a wide variety of other sensors that generate a sensor signal that is indicative of the geographic position or location of agricultural harvester 100.

As briefly discussed above, forward-looking device 116 can be a camera 190, which may be a monocamera or a stereo camera, and which captures images of area 117 ahead of harvester 100 in the direction of travel. Forward-looking device 116 may also be other forward-looking perception sensors or other forward-looking devices that sense characteristics of the crop ahead of harvester 100 which may indicate the path that harvester 100 is to follow. Forward-looking device 116 then generates a signal indicative of the sensed characteristics. If forward-looking device 116 is camera 190, then the signal generated by camera 190 is indicative of the image data or video data captured by camera 190. If the forward-looking device 116 is another forward-looking perception sensor 192, then the signal generated by sensor 192 is indicative of the characteristics sensed by the forward-looking perception sensor 192.

Sensors 154 may also include a machine speed sensor 194 which senses the speed of agricultural harvester 100. Speed sensor 194 can, for instance, be a sensor that senses machine speed by sensing the speed of rotation of an axel, or a ground engaging element, such as a wheel or track, or by sensing the speed of another element on harvester 100 which is indicative of the ground speed of harvester 100. In another example, machine speed sensor 194 can be a sensor that senses a characteristic from which the ground speed can be derived. Machine speed sensor 194 may, for instance, include geographic position sensor 188 so that a plurality of different geographic positions can be used, along with elapsed time, to calculate the speed and heading of machine 100.

Communication system 169 can facilitate communication among items on agricultural harvester 100 and with receiving vehicle 102, towing vehicle 104, and/or other system(s) 176 over network 174. Therefore, communication system 169 can include a controller area network (CAN) bus and CAN controller. System 169 can include a local area network communication system, a cellular communication system, a near field communication system, or any of a wide variety of other communication systems. Similarly, network 174 can be a local area network, a wide area network, a near field communication network, a cellular communication network, or any of a wide variety of other networks or combinations of networks.

Automatic fill control system 160 can perform automatic fill control either using an algorithm or a manual setpoint input. For instance, active fill control system 159 can run an active fill control algorithm 198. In such a scenario, automatic fill control system 160 can generate outputs to spout position controller 162 and flap position controller 164 to execute a fill strategy implemented by running active fill control algorithm 198. Automatic fill control system 160 can also perform automatic fill control operations even where no active fill control algorithm is executed. For instance, where operator 172 sets the spout and flap positions to fill a cart at a desired landing point, through manual setpoint fill control system 161, then control system 161 can generate outputs to spout position controller 162 and flap position controller 164 so that they control spout actuators 166 and flap actuators 168, respectively, to keep filling the receiving vehicle at that desired landing point.

System 160 can receive an input from automatic fill control sensors 180 to identify the desired landing point set based upon the operator inputs, or set by running active fill control algorithm 198. Automatic fill control system 160 can then receive inputs from camera 106 to determine whether the actual landing point of the harvested material in the receiving vessel 103 is the same as the desired landing point and, if not, control system 160 can generate control signals so that spout position controller 162 moves spout actuators 166, and/or so that flap position controller 164 moves flap actuators 168.

As discussed above, in some current systems, this is a reactive control process so that automatic fill control system 160 reacts to sensed or measured offsets between the desired landing point input by the operator or an active fill control algorithm and the actual landing point (sensed by camera 106). Therefore, as discussed above, if harvester 100 makes a turn, it may be that the relative positions of spout 108, relative to the receiving vessel 103, changes too quickly for automatic fill control system 160 to react to fully compensate for the change in relative position. This can result in harvested material being dumped on the ground, impacting the towing vehicle, landing in receiving vessel 103 at an undesirable landing point, or other undesirable circumstances.

Therefore, target heading identification system 156 identifies the location of upcoming turns, the degree of the upcoming turn, and when agricultural harvester 100 will begin making the upcoming turn. Based upon the location of the turn, the angle of the turn, and when the turn will be executed by harvester 100, target heading identification system 156 can generate an output to feed forward position compensation control system 220 which generates feed forward signals that can be used by automatic fill control system 160 to control spout position controller 162 and flap position controller 164 so that spout actuators 166 and flap actuators 168 can be controlled sufficiently ahead of time to compensate for the upcoming turn, as it is being executed by agricultural harvester 100. Turn angle and location identifier 212 first identifies the location and angle of an upcoming turn. Output generator 230 then generates an output indicative of one or more of the location and angle of the turn, the time it will take to get to and execute the turn. Feed forward position compensation control system 220 then identifies where the receiving vehicle will be during the turn, and where the landing point will be during the turn and output the information. The output can be used by automatic fill control system 160 to provide information to spout position controller 162 and flap position controller 164, at the correct time, to generate control signals to control spout actuators 166 and flap actuators 168, respectively, in order to move spout 108 and flap 109 to desired positions to hit the desired landing point in the receiving vehicle, even during the turn.

Turn angle and location identifier 212 can identify the location and angle of an upcoming turn (a turn ahead of agricultural harvester 100 in the direction of travel) in a number of different ways. For instance, image processor 214 can receive the signal from forward-looking device 116 and process that signal (image) to identify the location and angle of the turn. By way of example, in a scenario in which agricultural harvester 100 is a forage harvester that is following a windrow, the image processor 214 can process the image (of area 117 ahead of harvester 100) captured by camera 190 to identify that the windrow is about to turn, the location of that turn relative to agricultural harvester 100, and the angle of the turn. Similarly, where agricultural harvester 100 is harvesting standing crop, then image processor 214 can identify the crop rows, or the edge of the standing crop, to determine whether a turn is upcoming, and if so, the location of the turn and the angle of the turn.

In another example, map data processor 216 can identify the turn angle and location based upon a prior map 200. For example, prior pass map 202 may include information about where turns occurred on a prior pass by harvester 100 (or a different harvester) in the current field, during the current harvesting operation. In that case, map data processor 216 can obtain the location data for an adjacent pass to identify whether a turn is upcoming, the location of the turn and the angle of the turn. Prior operation map 204 may contain map data from a prior operation (such as a planting operation, a cutting and windrowing operation, or another prior operation) that indicates where turns are located in the field being harvested. Prior year map 206 may also contain information indicating where turns are located in the current field. In such scenarios, map data processor 216 can use the geographic position of agricultural harvester 100 sensed by geographic position sensor 118, and the heading of agricultural harvester 100 obtained from the output of sensor 188 or from one or more other sensors, along with the speed of agricultural harvester 100 indicated by the signal from machine speed sensor 194, to identify the location and angle of upcoming turns, and output generator 230 can output that information to feed forward position compensation control system 220.

Feed forward position compensation control system 220 can generate the feed forward position compensation outputs in a number of different ways. For example, receiving vehicle position identifier 222 can obtain the turn location and angle from turn angle and location identifier 212 and identify the relative position of the receiving vessel 103, relative to agricultural harvester 100 or spout 108, as agricultural harvester 100 is executing the turn. Similarly, landing point position identifier 224 can use the turn angle and location information output by turn angle and location identifier 212 to identify the landing point in the receiving vessel 103 as agricultural harvester 100 is executing the turn. Timing identifier 226 can use the turn angle and location information output by turn angle and location identifier 212, as well as the machine speed signal output by machine speed sensor 194 to determine when agricultural harvester 100 will encounter the turn, when it will execute the turn, and how long the turn will take.

System 220 generates an output indicative of one or more of the turn angle and location, the receiving vehicle position, the landing point position and the timing information and provides the output to automatic fill control system 160. Automatic fill control system 160 determines the positions where spout 108 and flap 109 should be positioned during the turn. System 160 can identify those positions using active fill control system 159 to continue the active fill strategy being implemented or using manual setpoint fill control system 161 to maintain the landing position the same as was set by the operator (or set in another way) even while agricultural harvester 100 is executing the upcoming turn.

The outputs from automatic fill control system 160 can be provided to spout position controller 162 and flap position controller 164. Spout position controller 162 then generates control signals to control spout actuators 166 to move spout 108 to the desired positions while agricultural harvester 100 is executing the turn. Spout position controller 162 can generate control signals before agricultural harvester 100 actually encounters the turn, so that the spout 108 can be moved to its position in sufficient time to compensate for the relative change in position between the receiving vessel 103 and the spout 108 that will be caused by harvester 100 executing the turn. Similarly, to the extent the position of flap 109 needs to change during the turn, flap position controller 164 can use the output from system 160 to generate control signals to control flap actuators 168 sufficiently ahead of the turn so that flap 109 can be controlled to move to its desired position in time to compensate for the relative change in positions between spout 108 and receiving vessel 103 caused by agricultural harvester 100 executing the turn.

Also, information can be provided to communication system 169. The information can include the turn angle and location and timing information and it can be provided to towing vehicle 104 so that towing vehicle 104 can also be controlled to compensate for the relative change in position between spout 108 and the receiving vessel 103 as agricultural harvester 100 navigates the turn.

Figure 5:
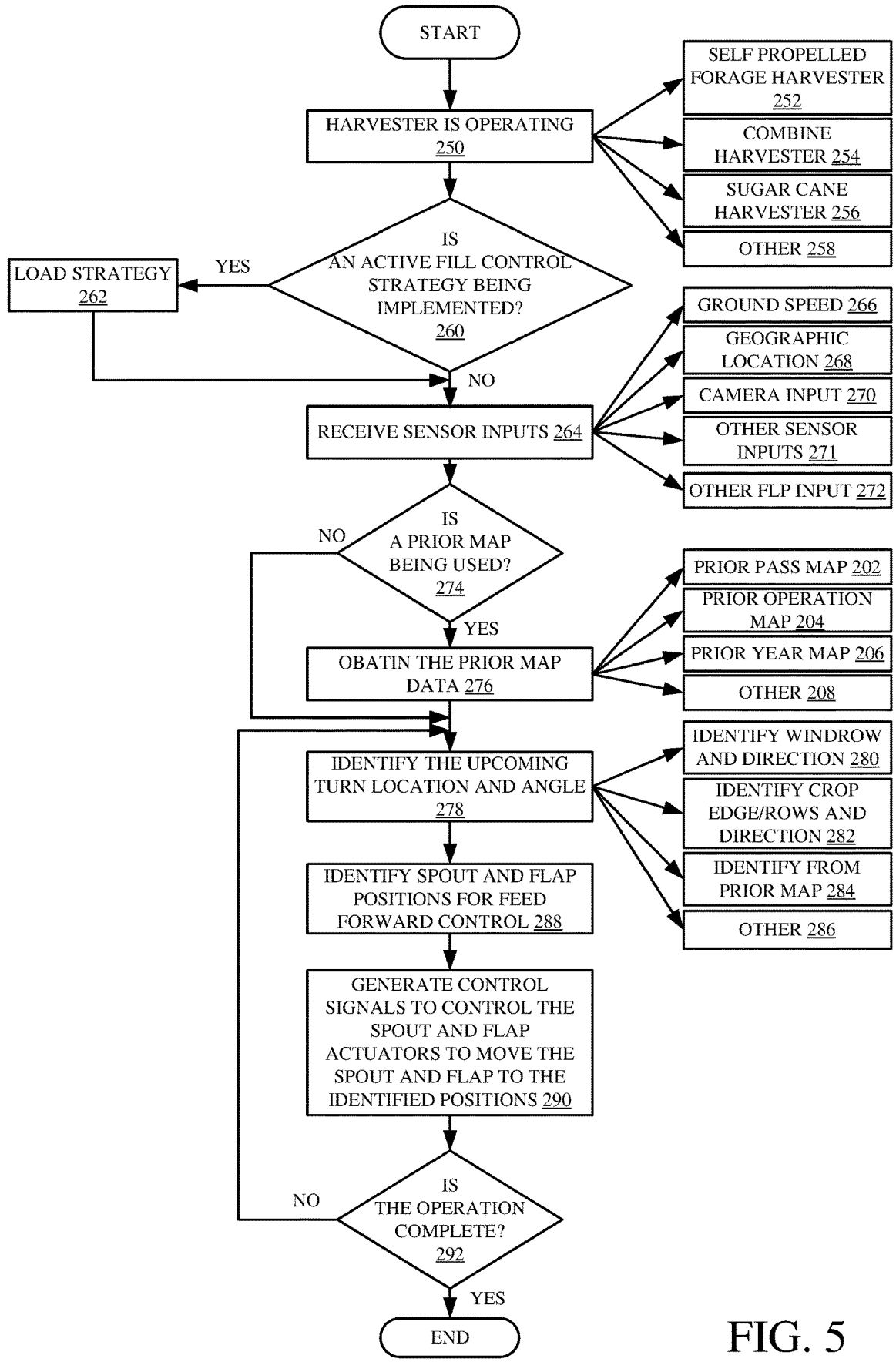
FIG. 5 is a flow diagram illustrating one example of the operation of a harvester detecting a turn and performing feed forward control in filling a receiving vehicle.

FIG. 5 is a flow diagram illustrating one example of the operation of agricultural harvester 100 in identifying upcoming turns and controlling the position of spout 108 and flap 109 sufficiently ahead of time so that spout 108 and flap 109 can compensate for the change in position of spout 108 relative to the receiving vessel 103 that will be caused by agricultural harvester 100 executing the turn. Agricultural harvester 100 is operating in a field as indicted by block 250 in the flow diagram of FIG. 5. The agricultural harvester may be a self-propelled forage harvester 252, a combine harvester 254, a sugarcane harvester 256, or another harvester 258. If an active fill control algorithm 198 is being implemented (such as by active fill control system 159) as indicated by block 260, then the active fill control algorithm 198 which implements that strategy is loaded into operating memory so that it can be performed by active fill control system 159. Loading the strategy or active fill control algorithm 198 is indicated by block 262 in the flow diagram of FIG. 5.

Target heading identification system 156 and automatic fill control system 160 then receive sensor inputs from sensors 154, as indicated by block 264. The sensor inputs can include ground speed 266 of harvester 100, geographic location 268 of harvester 100, a camera or other input 270 from forward-looking device 116, other sensor inputs 271 from other sensors 180, and/or another forward-looking perception input 272 from another forward-looking perception sensor 192.

If target heading identification system 156 is using a prior map 200, as indicated by block 274, then map data processor 216 obtains the prior map from data store 152, as indicated by block 276. Again, the prior map 200 can be a prior pass map 202, a prior operation map 204, a prior year map 206, or another prior map 208.

Turn angle and location identifier 212 then identifies the turn location and turn angle for any upcoming turn, as indicated by block 278. For example, image processor 214 can identify a windrow and the direction of the windrow in the area 117 ahead of harvester 100 as indicating a turn. Using the windrow to identify a turn is indicated by block 280. Image processor 214 can also identify a crop edge or crop rows of a crop being harvested, and the direction that the crop edge or crop rows turn in area 117 ahead of the harvester 100, as indicated by block 282 in the flow diagram of FIG. 5. Map data processor 216 can identify the turn angle and location of an upcoming turn from a prior map 200, as indicated by block 284 in the flow diagram of FIG. 5. Another turn angle and location identifier 218 can identify the turn angle and location in other ways as well, as indicated by block 286.

Feed forward position compensation control system 220 then identifies the spout and flap positions for feed forward control, in order to compensate for a change in the relative position of spout 108 and receiving vessel 103 that will occur as agricultural harvester 100 navigates the turn. Identifying the spout and flap positions for feed forward control is indicated by block 288 in the flow diagram of FIG. 5. The spout and flap positions can be directly output by control system 220 to spout position controller 162 or flap position controller 164 or to automatic fill control system 160. Automatic fill control system 160 can use active fill control system 159 to process the feed forward spout and flap position conformation to fill vessel 103 according to the active fill control algorithm 198 or use manual setpoint fill control system 161 to process the feed forward spout and flap position information to keep filling vessel 103 at a manually set landing position.

Spout position controller 162 and flap position controller 164 then generate control signals to control the spout actuators 166 and flap actuators 168 to move the spout 108 and flap 109 to the identified positions in order to perform position compensation while agricultural harvester 100 executes the turn. Generating the control signals is indicated by block 290 in the flow diagram of FIG. 5. Agricultural harvester 100 continues to identify upcoming turns and perform feed forward control for positioning spout 108 and flap 109 until the harvesting operation is complete, as indicated by block 292.

Figure 6A:
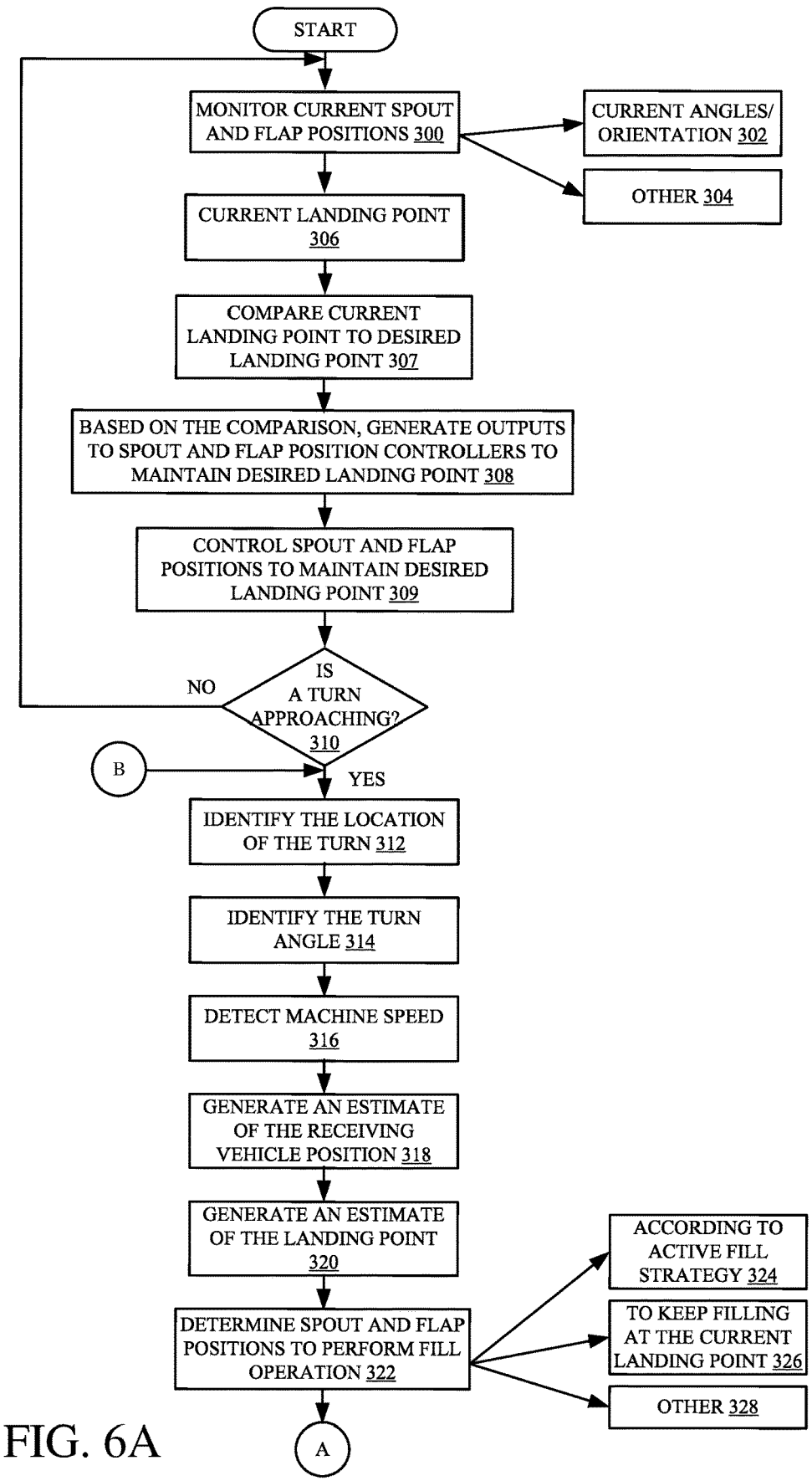
FIGS. 6A and 6B (collectively referred to herein as FIG. 6) show a flow diagram illustrating one example of the operation of a harvester in controlling a filling mechanism.
Figure 6B:
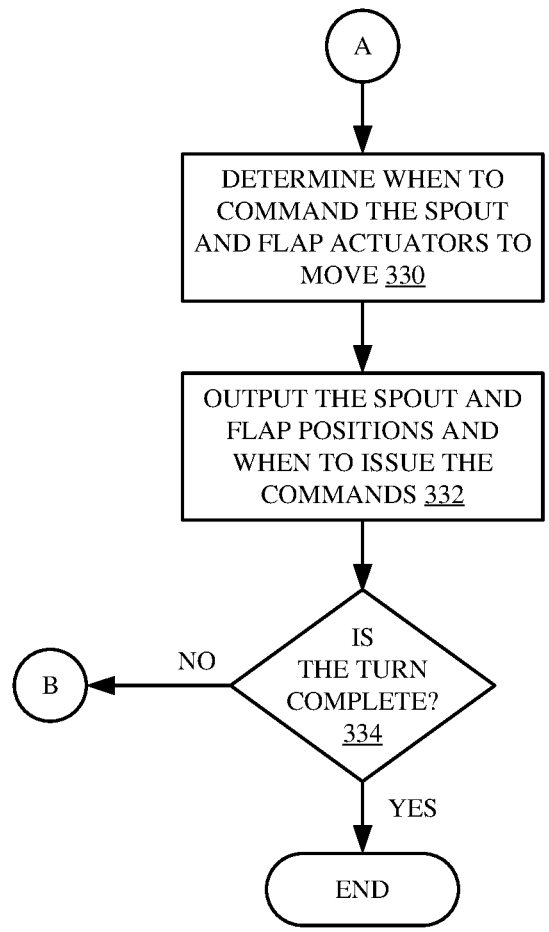

FIGS. 6A and 6B (collectively referred to herein as FIG. 6) show a flow diagram illustrating one example of the operation of agricultural harvester 100 in identifying feed forward spout and flap positions for spout 108 and flap 109, respectively, so that they can be proactively controlled to compensate for the relative change in position of spout 108 relative to receiving vessel 103, while agricultural harvester 100 executes a turn. It is assumed, for the sake of the description of FIG. 6, that target heading identification system 156 identifies the angle and location of an upcoming turn by analyzing an image obtained from forward-looking device 116, and provides that information to feed forward position compensation control system 220 which generates the feed forward control information identifying positions of vessel 103 and the landing point and provides it to automatic fill control system 160. Automatic fill control system 160, in turn, generates control information for controlling spout 108 and flap 109 and outputs the control information to spout position controller 162 and flap position controller 164. Spout position controller 162, in turn, generates, control signals to control spout actuator 166, at the proper time, to move spout 108 to compensate for changes in position caused by harvester 100 executing the turn. Flap position controller 164, in turn, generates control signals to control flap actuators 168 so that flap 109 is positioned to compensate for the changes in position as well.

Automatic fill control system 160 thus first monitors the current spout and flap positions, as indicated by block 300 in the flow diagram of FIG. 6. Control system 160 can monitor the current spout and flap positions by receiving a sensor signal from spout position sensor 184 and flap position sensor 186 which are indicative of the current angles or orientations of spout 108 and flap 109, respectively. Receiving the sensor signals from sensors 184 and 186 is indicated by block 302 in the flow diagram of FIG. 6. Control system 160 can identify the current spout and flap positions and the current landing point in other ways as well, as indicated by block 304.

Control system 160 may also identify the current landing position of the harvested material, by analyzing images captured from automatic fill control sensors 180. Identifying the current landing point is indicated by block 306 in the flow diagram of FIG. 6.

Control system 160 then compares the current landing point to the desired landing point. The desired landing point may be one generated by active fill control system 159 running the active fill control algorithm 198 or by having manual setpoint control system 161 sense a manually input landing setpoint. Comparing the current landing point to the desired landing point is indicated by block 307. Based on the comparison, automatic fill control system 160 generates outputs to spout position controller 162 and flap position controller 164 to maintain the desired landing point, as indicated by block 308.

Spout position controller 162 and flap position controller 164 then control the spout and flap actuators 166 and 168, respectively, so that the positions of spout 108 and flap 109 are controlled to maintain a desired landing point within the receiving vessel 103. Controlling the spout and flap actuators 166 and 168 in this way is indicated by block 309 in the flow diagram of FIG. 6. For example, the desired landing point may be the current landing point, as set by the operator or by an active fill control algorithm, or in other ways.

Target heading identification system 156 then determines whether a turn is approaching. This can be done by analyzing the information provided by forward-looking device 116, or in other ways. Determining whether a turn is approaching is indicated by block 310 in the flow diagram of FIG. 6. If no turn is approaching, then processing reverts to block 300 where the system continues to monitor the current spout and flap positions and/or the current landing point, and continues to control the spout 108 and flap 109 to maintain a desired landing point. However, if, at block 310, it is determined that a turn is approaching, then turn angle and location identifier 212 identifies the location of the turn. The location of the turn can be identified based upon where the turn begins relative to the location of harvester 100, where the turn begins and ends, the center of the turn, or in other ways. Identifying the location of the turn relative to the location of harvester 100 can be done using the current geographic position of agricultural harvester 100 indicated by the sensor signal from geographic position sensor 188, along with machine dimensions and dynamics of harvester 100 and/or geometric image processing performed on the image output by camera 190, or in other ways. For instance, if it is known where the field of view of camera 190 (and hence area 117) is relative to harvester 100 based on machine dimensions and dynamic or based on geometric image processing, then the location of a turn in area 117, relative to the location of harvester 100, can be determined. Identifying the location of the turn is indicated by block 312 in the flow diagram of FIG. 6.

Turn angle and location identifier 212 may also identify the turn angle, as indicated by block 314. The turn angle can be identified in a number of different ways. For instance, where harvester 100 is following a windrow, geographic image processing can be performed to identify the windrow, and identify the angle of the turn in the windrow. Similar processing can be performed when harvester 100 is following crop rows. Also, where the edge of the harvested crop is identified (such as where the harvester is cutting alfalfa, sugarcane, or another crop), then the turn angle can be identified by identifying how sharply the edge of the crop turns.

Feed forward position compensation control system 220 then generates information that can be used to command movement of spout 108 and flap 109, in a feed forward way, to compensate for the relative change in position between spout 108 and the receiving vessel 103 that will occur when harvester 100 executes the upcoming turn. Control system 220 can thus obtain the machine speed of harvester 100 from machine speed sensor 194. Detecting machine speed is indicated by block 316 in the flow diagram of FIG. 6.

The receiving vehicle position identifier 222 generates an estimate of the position that the receiving vehicle will be in, as agricultural harvester 100 begins, continues through, and exits the upcoming turn. Generating an estimate of the receiving vehicle position is indicated by block 318 in the flow diagram of FIG. 6. Landing point position identifier 224 generates an estimate of the landing point in the receiving vehicle, as harvester 100 executes the turn, as indicated by block 320. Based upon the estimated receiving vehicle position and landing point, the spout and flap positions that are needed to perform a desired fill operation are determined, as indicated by block 322. For instance, active fill control system 159 may be providing position signals or other signals to spout position controller 162 and flap position controller 164 so that spout 108 and flap 109 are controlled according to an active fill strategy, as indicated by block 324. In another example, it may be that the operator has set the landing point and the spout 108 and flap 109 are positioned using manual setpoint fill control system 161 to maintain that landing point, as indicated by block 326. The spout and flap position information can be determined in accordance with performing a fill operation in other ways as well, as indicated by block 328.

Timing identifier 226 identifies a time when the spout actuators 166 and flap actuators 168 should be commanded to move, so that the position of spout 108 can be changed to compensate for the relative change in position between the spout 108 and the receiving vessel 103 caused by harvester 100 executing the upcoming turn. To determine the timing information, timing identifier 226 can consider the distance the turn is from harvester 100, the speed of harvester 100, the responsiveness of actuators 166 and 168 (which may be predefined, sensed or obtained in other ways), and how far actuators 166 and 168 must travel to maintain the desired landing point during the turn. Determining the timing information is indicated by block 330 in the flow diagram of FIG. 6.

In the example discussed with respect to FIG. 6, output generator 230 then outputs the spout and flap positions and the timing information indicating when to issue commands to the spout actuators 166 and flap actuators 168 in order to compensate for the change in relative position between spout 108 and receiving vessel 103 caused by harvester 100 executing the turn. Outputting the spout and flap positions and timing information is indicated by block 332 in the flow diagram of FIG. 6.

Until the turn is complete, as indicated by block 334, processing reverts to block 312 where the continued turn location and turn angle are identified, the machine speed is detected, the estimates of receiving vehicle position and landing point are generated, and the desired spout and flap positions, along with the timing information, are also determined.

It can thus be seen that the present discussion proceeds with respect to a system that identifies an upcoming turn, before it is reached by harvester 100. Based on the location of the turn, and the turn angle, the present description generates feed forward data that can be used to control the position of spout 108 and flap 109, ahead of time, so that even if there is a significant delay due to the responsiveness of actuators 166 and 168, or for other reasons, the spout 108 and flap 109 can still be positioned quickly enough to compensate for the change in position of spout 108 relative to receiving vessel 103 which is caused by harvester 100 executing the turn. This results in reduced loss of harvested material, even during turns.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. The interface displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 7:
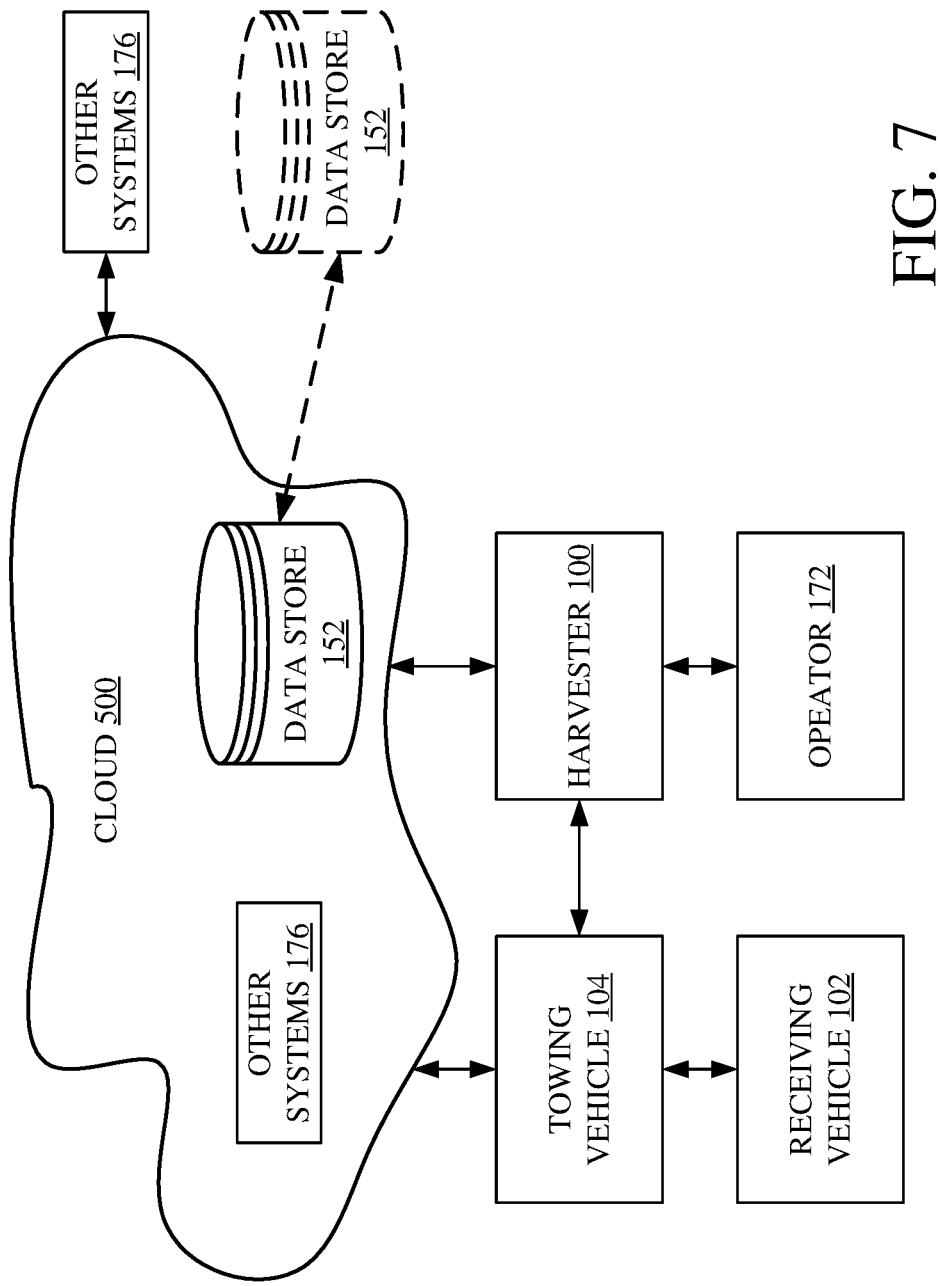
FIG. 7 shows a block diagram of a harvester in a remote server architecture.

FIG. 7 is a block diagram of harvester 100, shown in FIGS. 1-4, except that it communicates with elements in a remote server architecture 500. In an example, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIGS. 1-4 as well as the corresponding data, can be stored on servers at a remote location. The computing resources in a remote server environment can be consolidated at a remote data center location or they can be dispersed. Remote server infrastructures can deliver services through shared data centers, even though the servers appear as a single point of access for the user. Thus, the components and functions described herein can be provided from a remote server at a remote location using a remote server architecture. Alternatively, the components and functions can be provided from a conventional server, or they can be installed on client devices directly, or in other ways.

In the example shown in FIG. 7, some items are similar to those shown in FIGS. 1-4 and they are similarly numbered. FIG. 7 specifically shows that data store 152, other systems 176, and other parts of the harvester 100 shown in FIG. 4 can be located at a remote server location 502. Therefore, harvester 100 accesses those systems through remote server location 502.

FIG. 7 also depicts another example of a remote server architecture. FIG. 7 shows that it is also contemplated that some elements of FIG. 4 are disposed at remote server location 502 while others are not. By way of example, data store 152 or other systems 176 can be disposed at a location separate from location 502, and accessed through the remote server at location 502. Regardless of where the items are located, the items can be accessed directly by harvester 100, through a network (such as a wide area network or a local area network), the items can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the harvester 100 comes close to the fuel truck for fueling, the system automatically collects the information from the harvester 100 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester 100 until the harvester 100 enters a covered location. The harvester 100, itself, can then send the information to the main network.

It will also be noted that the elements of FIGS. 1-4 or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
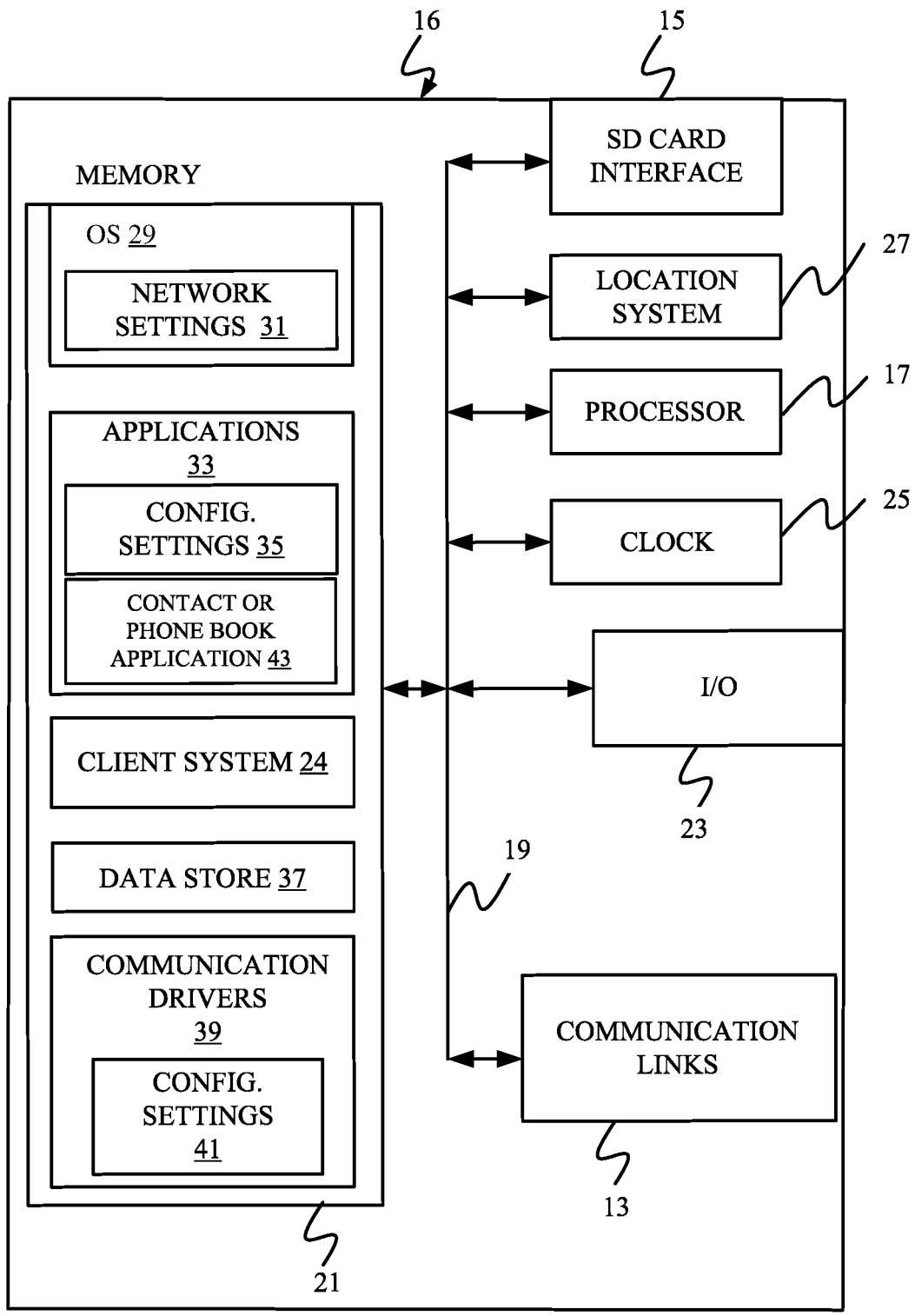
FIGS. 8-10 show examples of mobile devices that can be used in harvesters.
Figure 9:
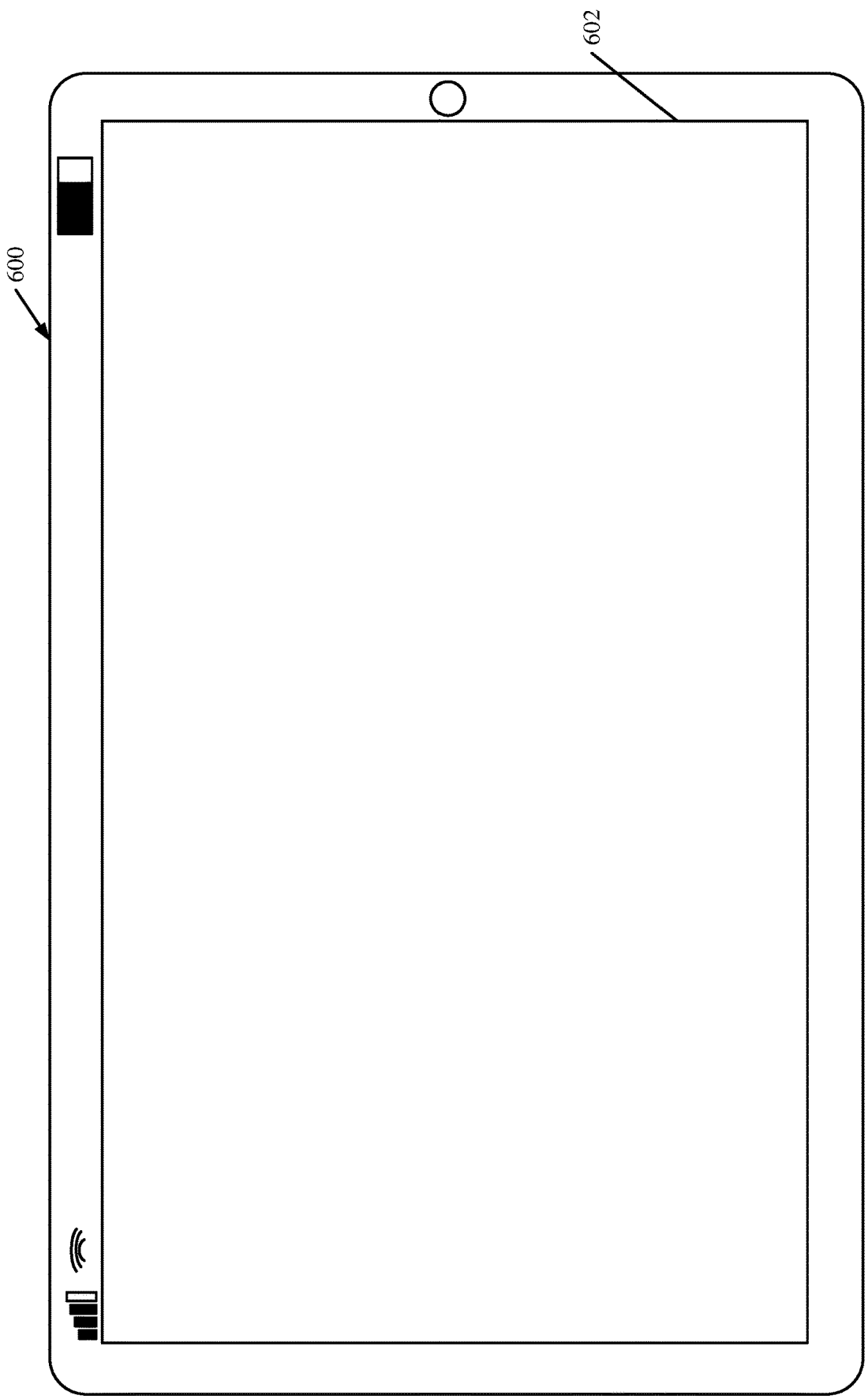
Figure 10:
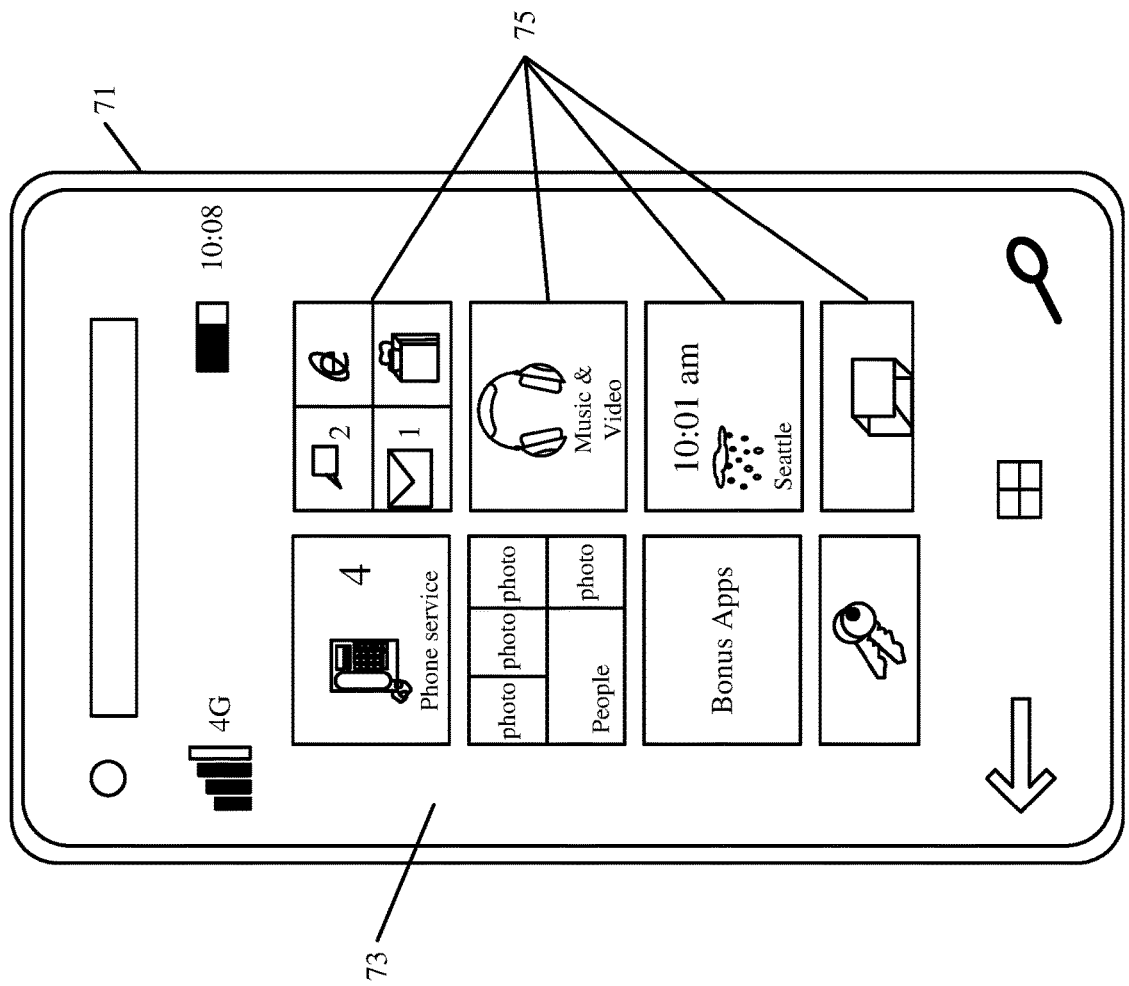

FIG. 8 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the spout and flap and turn data. FIGS. 9-10 are examples of handheld or mobile devices.

FIG. 8 provides a general block diagram of the components of a client device 16 that can run some components shown in FIG. 4, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors/servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 9 shows one example in which device 16 is a tablet computer 600. In FIG. 9, computer 600 is shown with user interface display screen 602. Screen 602 can be a touch screen or a pen-enabled interface that receives inputs from a pen or stylus. computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
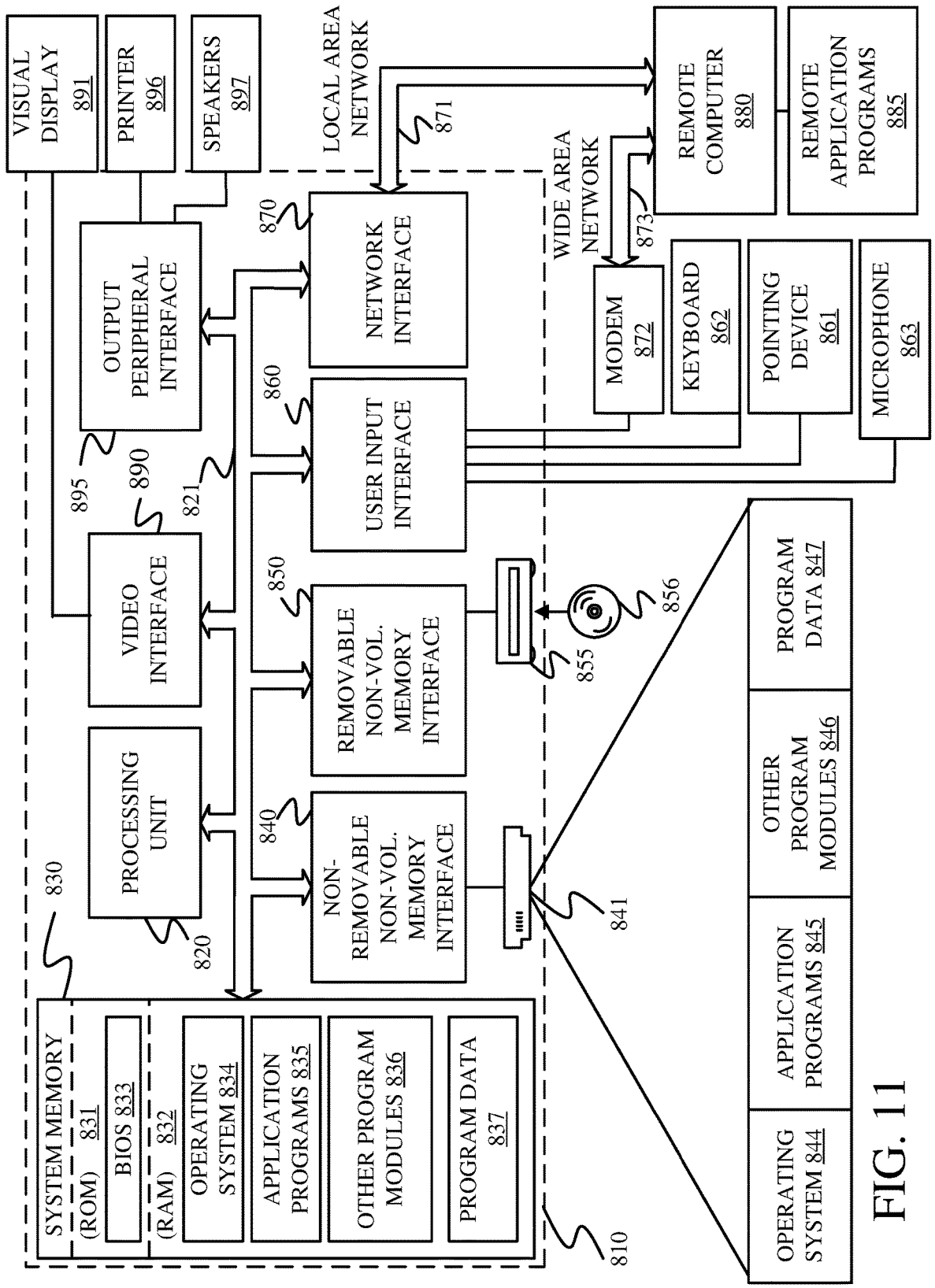
FIG. 11 is a block diagram of a computing environment that can be used in the machines, systems, and architectures shown and discussed with respect to the previous figures.

FIG. 11 is one example of a computing environment in which elements of FIGS. 1-4, or parts of it, (for example) can be deployed. With reference to FIG. 11, an example system for implementing some embodiments includes a computing device in the form of a computer 810 programmed to operate as discussed above. Components of computer 810 may include, but are not limited to, a processing unit 820 (which can comprise processor or servers from pervious FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 4 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 11 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is an agricultural system, comprising:
an agricultural harvester having a frame;
a spout having an outlet end and being movably mounted relative to the frame;
a spout actuator that drives movement of the spout relative to the frame based on a spout actuator control signal;
harvesting functionality, mounted to the frame, that engages material from a field and delivers the material through the outlet end of the spout as the agricultural harvester moves through the field in a direction of travel;
a turn identifier that identifies a location of a turn forward of the agricultural harvester in the direction of travel and generates a turn location indicator indicative of the location of the turn;
a speed detector that detects a speed of the agricultural harvester and generates a speed indicator indicative of the detected speed;
a position compensation control system that generates spout position compensation information for controlling the spout actuator based on the turn location indicator and the speed indicator; and
a spout position controller that generates the spout actuator control signal to control the spout actuator based on the spout position compensation information.

Example 2 is the agricultural system of any or all previous examples wherein the position compensation control system is configured to send the spout position compensation information to the spout position controller prior to the agricultural harvester executing the turn.

Example 3 is the agricultural system of any or all previous examples wherein the turn identifier comprises:
- a turn angle identifier that identifies a characteristic indicative of an angle of the turn and generates a turn angle indicator based on the angle of the turn, the position compensation control system generating the spout position compensation information for controlling the spout actuator based on the turn angle indicator.

Example 4 is the agricultural system of any or all previous examples and further comprising:
- a forward-looking sensor that captures an image of the material forward of the harvester in the direction of travel and generates a material characteristic image signal indicative of the captured image.

Example 5 is the agricultural system of any or all previous examples wherein the turn identifier comprises:
- an image processor that identifies an orientation of the material forward of the harvester and that identifies the location of the turn based on the orientation of the material.

Example 6 is the agricultural system of any or all previous examples wherein the turn angle identifier is configured to generate the turn angle indicator based on the orientation of the material.

Example 7 is the agricultural system of any or all previous examples wherein the material comprises a windrow and wherein the image processor is configured to identify, as the orientation of the material, a turn in the windrow forward of the agricultural harvester and an angle of the turn.

Example 8 is the agricultural system of any or all previous examples wherein the material comprises a crop row or crop edge and wherein the image processor is configured to identify, as the orientation of the material, a turn in the crop row or crop edge forward of the agricultural harvester and an angle of the turn.

Example 9 is the agricultural system of any or all previous examples wherein the turn identifier comprises:
- a map data processor configured to access a prior map of the field and to identify the location of the turn and the angle of the turn.

Example 10 is the agricultural system of any or all previous examples and further comprising:
- a flap movably mounted to the outlet end of the spout; and
- a flap actuator that drives movement of the flap relative to the spout, wherein the position compensation control system generates flap position compensation information for controlling the flap actuator based on the turn location indicator, the turn angle indicator, and the speed indicator; and
- a flap position controller that generates a flap actuator control signal to control the flap actuator based on the flap position compensation information.

Example 11 is the agricultural system of any or all previous examples wherein the spout outputs the material to a receiving vessel that is separate from the agricultural harvester and wherein the position compensation control system is configured to determine a change in a position of the outlet end of the spout relative to a position of the receiving vessel that will result from the agricultural harvester executing the turn, the position compensation control system being further configured to generate the spout position compensation information and the flap position compensation information based on the change in a position of the outlet end of the spout relative to a position of the receiving vessel that will result from the agricultural harvester executing the turn.

Example 12 is a computer implemented method of controlling an agricultural harvester, comprising:
- an agricultural harvester having a frame;
- a spout having an outlet end and being movably mounted relative to the frame;
- a spout actuator that drives movement of the spout relative to the frame based on a spout actuator control signal;
- engaging material from a field with harvesting functionality to deliver the material through an outlet end of a spout as the agricultural harvester moves through the field in a direction of travel, the spout being movably mounted relative to a frame of the agricultural harvester, movement of the spout relative to the frame being driven by a spout actuator;
- identifying a location of a turn forward of the agricultural harvester in the direction of travel;
- generating a turn location indicator indicative of the location of the turn;
- detecting a speed of the agricultural harvester;
- generating a speed indicator indicative of the detected speed;
- generating, prior to the agricultural harvester executing the turn, spout position compensation information for controlling the spout actuator based on the turn location indicator and the speed indicator; and
- generating a spout actuator control signal to control the spout actuator based on the spout position compensation information.

Example 13 is the method of any or all previous examples wherein generating a spout actuator control signal comprises:
- generating the spout actuator control signal to compensate for movement of the outlet end of the spout relative to a receiving vessel, separate from the agricultural harvester, caused by the agricultural harvester executing the turn.

Example 14 is the method of any or all previous examples and further comprising:
- identifying a characteristic indicative of an angle of the turn; and
- generating a turn angle indicator based on the characteristic indicative of the angle of the turn, wherein generating the spout position compensation information comprises generating the spout position compensation information for controlling the spout actuator based on the turn angle indicator.

Example 15 is the method of any or all previous examples wherein identifying a location of the turn and identifying a characteristic indicative of the angle of the turn comprises:
- capturing an image of the material forward of the harvester in the direction of travel; and
- processing the captured image to identify an orientation of the material forward of the harvester, to identify the location of the turn based on the orientation of the material, and to identify the turn angle based on the orientation of the material.

Example 16 is the method of any or all previous examples wherein the material comprises a windrow and wherein processing the image to identify the orientation of the material comprises:
- processing the image to identify, as the location of the turn, a location of a turn in the windrow forward of the agricultural harvester, and to identify, as the turn angle, a turn angle of the turn in the windrow.

Example 17 is the method of any or all previous examples wherein identifying a location of the turn and identifying a characteristic indicative of the angle of the turn comprises:
accessing a prior map of the field; and
identifying the location of the turn and the angle of the turn based on the prior map.

Example 18 is the method of any or all previous examples and further comprising:
generating, prior to the agricultural harvester executing the turn, flap position compensation information for controlling a flap actuator that drives movement of a flap movably mounted to the outlet end of the spout, the flap position compensation information being generated based on the turn location indicator, the turn angle indicator, and the speed indicator; and
generating a flap actuator control signal to control the flap actuator based on the flap position compensation information.

Example 19 is the method of any or all previous examples wherein the spout outputs the material to a receiving vessel that is separate from the agricultural harvester and wherein generating the flap position compensation information and generating the spout position compensation information comprises:
determining a change in a position of the outlet end of the spout relative to a position of the receiving vessel that will result from the agricultural harvester executing the turn;
generating the spout position compensation information and the flap position compensation information based on the change in a position of the outlet end of Example 9 is the spout relative to a position of the receiving vessel that will result from the agricultural harvester executing the turn.

Example 20 is an agricultural harvester, comprising:
a frame;
a spout having an outlet end and being movably mounted relative to the frame;
a spout actuator that drives movement of the spout relative to the frame based on a spout actuator control signal;
a flap movably mounted to the outlet end of the spout;
a flap actuator that drives movement of the flap relative to the spout based on a flap actuator control signal;
harvesting functionality, mounted to the frame, that engages material from a field and delivers the material through the outlet end of the spout as the harvester moves through the field in a direction of travel;
a turn identifier that identifies a location and angle of a turn forward of the agricultural harvester in the direction of travel and generates a turn location and angle indicator indicative of the location and angle of the turn;
a speed detector that detects a speed of the agricultural harvester and generates a speed indicator indicative of the detected speed;
a position compensation control system that generates spout position compensation information for controlling the spout actuator and that generates flap position compensation information for controlling the flap actuator, based on the turn location and angle indicator and the speed indicator, the position compensation control system outputting the spout position compensation information and the flap position compensation information prior to the agricultural harvester executing the turn;
a spout position controller that receives the spout position compensation information prior to the agricultural harvester executing the turn and generates the spout actuator control signal to control the spout actuator based on the spout position compensation information; and
a flap position controller that receives the flap position compensation information prior to the agricultural harvester executing the turn and generates the flap actuator control signal to control the flap actuator based on the flap position compensation information.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An agricultural system, comprising:
an agricultural harvester having a frame;
a spout having an outlet end and being movably mounted relative to the frame;
a spout actuator that drives movement of the spout relative to the frame based on a spout actuator control signal;
harvesting functionality, mounted to the frame, that engages material from a field and delivers the material through the outlet end of the spout as the agricultural harvester moves through the field in a direction of travel;
a forward-looking sensor that captures an image of the material forward of the harvester in the direction of travel;
a turn location and angle identifier comprising an image processor that processes the captured image of the material forward of the agricultural harvester in the direction of travel, identifies a location of a turn forward of the agricultural harvester in the direction of travel, identifies an orientation of the material forward of the harvester in the direction of travel, and identifies an angle of the turn forward of the agricultural harvester in the direction of travel based on the identified orientation of the material forward of the harvester in the direction of travel, wherein the turn location and angle identifier generates a turn location indicator indicative of the location of the turn and generates a turn angle indicator indicative of the angle of the turn;
a speed detector that detects a speed of the agricultural harvester and generates a speed indicator indicative of the detected speed;
a position compensation control system that generates spout position compensation information for controlling the spout actuator based on the turn location indicator, the turn angle indicator, and the speed indicator; and
a spout position controller that generates the spout actuator control signal to control the spout actuator based on the spout position compensation information.

2. The agricultural system of claim 1 wherein the position compensation control system is configured to send the spout position compensation information to the spout position controller prior to the agricultural harvester executing the turn.

3. The agricultural system of claim 1 wherein the material comprises a windrow and wherein the image processor is configured to identify, as the orientation of the material, a turn in the windrow forward of the agricultural harvester and an angle of the turn.

4. The agricultural system of claim 1 wherein the material comprises a crop row or crop edge and wherein the image processor is configured to identify, as the orientation of the material, a turn in the crop row or crop edge forward of the agricultural harvester and an angle of the turn.

5. The agricultural system of claim 1 and further comprising:
   a flap movably mounted to the outlet end of the spout; and
   a flap actuator that drives movement of the flap relative to the spout, wherein the position compensation control system generates flap position compensation information for controlling the flap actuator based on the turn location indicator, the turn angle indicator, and the speed indicator; and
   a flap position controller that generates a flap actuator control signal to control the flap actuator based on the flap position compensation information.

6. The agricultural system of claim 5 wherein the spout outputs the material to a receiving vessel that is separate from the agricultural harvester and wherein the position compensation control system is configured to determine a change in a position of the outlet end of the spout relative to a position of the receiving vessel that will result from the agricultural harvester executing the turn, the position compensation control system being further configured to generate the spout position compensation information and the flap position compensation information based on the change in a position of the outlet end of the spout relative to a position of the receiving vessel that will result from the agricultural harvester executing the turn.

7. A method of controlling an agricultural harvester, comprising:
   an agricultural harvester having a frame;
   a spout having an outlet end and being movably mounted relative to the frame;
   a spout actuator that drives movement of the spout relative to the frame based on a spout actuator control signal;
   engaging material from a field with harvesting functionality to deliver the material through an outlet end of a spout as the agricultural harvester moves through the field in a direction of travel;
   capturing an image of material forward of the agricultural harvester in the direction of travel;
   processing the captured image of the material forward of the agricultural harvester in the direction of travel to identify an orientation of the material forward of the agricultural harvester in the direction of travel, to identify a location of a turn forward of the agricultural harvester in the direction of travel based on the orientation of the material forward of the agricultural harvester in the direction of travel, and to identify an angle of the turn forward of the agricultural harvester in the direction of travel based on the orientation of the material forward of the agricultural harvester in the direction of travel;
   generating a turn location indicator indicative of the location of the turn;
   generating a turn angle indicator indicative of the angle of the turn;
   detecting a speed of the agricultural harvester;
   generating a speed indicator indicative of the detected speed;
   generating, prior to the agricultural harvester executing the turn, spout position compensation information for controlling the spout actuator based on the turn location indicator, the turn angle indicator, and the speed indicator; and
   generating a spout actuator control signal to control the spout actuator based on the spout position compensation information.

8. The method of claim 7, wherein generating the spout actuator control signal comprises:
   generating the spout actuator control signal to compensate for movement of the outlet end of the spout relative to a receiving vessel, separate from the agricultural harvester, caused by the agricultural harvester executing the turn.

9. The method of claim 7 wherein the material forward of the agricultural harvester in the direction of travel comprises a windrow forward of the agricultural harvester in the direction of travel and wherein processing the captured image comprises:
   processing the captured image to identify, as the orientation of the material forward of the agricultural harvester in the direction of travel, an orientation of the windrow forward of the agricultural harvester in the direction of travel, to identify, as the location of the turn forward of the agricultural harvester in the direction of travel, a location of a turn in the windrow forward of the agricultural harvester in the direction of travel based on the orientation of the windrow forward of the agricultural harvester in the direction of travel, and to identify, as the angle of the turn forward of the agricultural harvester in the direction of travel, an angle of a turn in the windrow forward of the agricultural harvester in the direction of travel based on the orientation of the windrow forward of the agricultural harvester in the direction of travel.

10. The method of claim 7 and further comprising:
    generating, prior to the agricultural harvester executing the turn, flap position compensation information for controlling a flap actuator that drives movement of a flap movably mounted to the outlet end of the spout, the flap position compensation information being generated based on the turn location indicator, the turn angle indicator, and the speed indicator; and
    generating a flap actuator control signal to control the flap actuator based on the flap position compensation information.

11. The method of claim 10 wherein the spout outputs the material to a receiving vessel that is separate from the agricultural harvester and wherein generating the flap position compensation information and generating the spout position compensation information comprises:
    determining a change in a position of the outlet end of the spout relative to a position of the receiving vessel that will result from the agricultural harvester executing the turn;
    generating the spout position compensation information and the flap position compensation information based on the change in a position of the outlet end of the spout relative to a position of the receiving vessel that will result from the agricultural harvester executing the turn.

12. An agricultural harvester, comprising:
    a frame;

a spout having an outlet end and being movably mounted relative to the frame;

a spout actuator that drives movement of the spout relative to the frame based on a spout actuator control signal;

a flap movably mounted to the outlet end of the spout;

a flap actuator that drives movement of the flap relative to the spout based on a flap actuator control signal;

harvesting functionality, mounted to the frame, that engages material from a field and delivers the material through the outlet end of the spout as the harvester moves through the field in a direction of travel;

a forward-looking sensor that captures an image of material forward of the harvester in the direction of travel;

a turn location and angle identifier that processes the captured image of the material forward of the agricultural harvester, identifies an orientation of the material forward of the agricultural harvester, identifies a location and angle of a turn forward of the agricultural harvester in the direction of travel based on the identified orientation of the material forward of the agricultural harvester, and generates a turn location indicator indicative of the location of the turn and an angle indicator indicative of the angle of the turn;

a speed detector that detects a speed of the agricultural harvester and generates a speed indicator indicative of the detected speed;

a position compensation control system that generates spout position compensation information for controlling the spout actuator and that generates flap position compensation information for controlling the flap actuator, based on the turn location indicator, the angle indicator, and the speed indicator, the position compensation control system outputting the spout position compensation information and the flap position compensation information prior to the agricultural harvester executing the turn;

a spout position controller that receives the spout position compensation information prior to the agricultural harvester executing the turn and generates the spout actuator control signal to control the spout actuator based on the spout position compensation information; and a flap position controller that receives the flap position compensation information prior to the agricultural harvester executing the turn and generates the flap actuator control signal to control the flap actuator based on the flap position compensation information.

13. The method of claim 7 wherein the material forward of the agricultural harvester in the direction of travel comprises a crop row forward of the agricultural harvester in the direction of travel and wherein processing the captured image comprises:

processing the captured image to identify, as the orientation of the material forward of the agricultural harvester in the direction of travel, an orientation of the crop row forward of the agricultural harvester in the direction of travel, to identify, as the location of the turn forward of the agricultural harvester in the direction of travel, a location of a turn in the crop row forward of the agricultural harvester in the direction of travel based on the orientation of the crop row forward of the agricultural harvester in the direction of travel, and to identify, as the angle of the turn forward of the agricultural harvester in the direction of travel, an angle of a turn in the crop row forward of the agricultural harvester in the direction of travel based on the orientation of the crop row forward of the agricultural harvester in the direction of travel.

14. The method of claim 7 wherein the material forward of the agricultural harvester in the direction of travel comprises a crop edge forward of the agricultural harvester in the direction of travel and wherein processing the captured image comprises:

processing the captured image to identify, as the orientation of the material forward of the agricultural harvester in the direction of travel, an orientation of the crop edge forward of the agricultural harvester in the direction of travel, to identify, as the location of the turn forward of the agricultural harvester in the direction of travel, a location of a turn in the crop edge forward of the agricultural harvester in the direction of travel based on the orientation of the crop edge forward of the agricultural harvester in the direction of travel, and to identify, as the angle of the turn forward of the agricultural harvester in the direction of travel, an angle of a turn in the crop edge forward of the agricultural harvester in the direction of travel based on the orientation of the crop edge forward of the agricultural harvester in the direction of travel.

\* \* \* \* \*